United States Patent
Kawasaki

(10) Patent No.: US 9,380,579 B2
(45) Date of Patent: Jun. 28, 2016

(54) RADIO SIGNAL TRANSMISSION METHOD, RADIO SIGNAL TRANSMITTING DEVICE, RADIO SIGNAL RECEIVING DEVICE, RADIO BASE STATION DEVICE AND RADIO TERMINAL DEVICE

(71) Applicant: FUJITSU LIMITED, Kawasaki-shi, Kanagawa (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 14/224,171

(22) Filed: Mar. 25, 2014

(65) Prior Publication Data

US 2014/0204900 A1 Jul. 24, 2014

Related U.S. Application Data

(63) Continuation of application No. PCT/JP2011/072270, filed on Sep. 28, 2011.

(51) Int. Cl.
*H04W 72/04* (2009.01)
*H04L 5/00* (2006.01)
*H04L 27/26* (2006.01)

(52) U.S. Cl.
CPC ........... *H04W 72/0446* (2013.01); *H04L 5/001* (2013.01); *H04L 5/0005* (2013.01); *H04L 5/0092* (2013.01); *H04L 27/2602* (2013.01)

(58) Field of Classification Search
CPC ..... H04L 5/0005; H04L 5/0092; H04L 5/001; H04W 72/0446
See application file for complete search history.

(56) References Cited

U.S. PATENT DOCUMENTS

| | | | | |
|---|---|---|---|---|
| 7,822,617 B2 * | 10/2010 | Taleb | ................... | G10L 19/002 704/200.1 |
| 8,031,583 B2 | 10/2011 | Classon et al. | | |
| 8,094,738 B2 | 1/2012 | Nishio et al. | | |
| 8,175,015 B1 * | 5/2012 | Chowdhuri | ............. | G06F 9/461 370/300 |
| 8,194,612 B2 | 6/2012 | Kawasaki et al. | | |
| 8,401,051 B2 | 3/2013 | Nishio et al. | | |
| 8,542,639 B2 * | 9/2013 | Kwak | .................. | H04B 7/2615 370/203 |
| 2007/0058595 A1 | 3/2007 | Classon et al. | | |
| 2007/0064669 A1 * | 3/2007 | Classon | ................ | H04L 1/1822 370/347 |
| 2009/0003477 A1 | 1/2009 | Nishio et al. | | |
| 2009/0116421 A1 * | 5/2009 | Kawasaki | ............. | H04L 5/0091 370/312 |
| 2009/0122771 A1 * | 5/2009 | Cai | ......................... | H04J 11/00 370/338 |
| 2009/0180443 A1 | 7/2009 | Kawasaki et al. | | |
| 2009/0185632 A1 * | 7/2009 | Cai | ....................... | H04L 5/0044 375/260 |

(Continued)

FOREIGN PATENT DOCUMENTS

| | | |
|---|---|---|
| JP | 2008-535391 A | 8/2008 |
| JP | 2010-206488 A | 9/2010 |

(Continued)

OTHER PUBLICATIONS

International Search Report, mailed in connection with PCT/JP2011/072270 and mailed Dec. 27, 2011.

*Primary Examiner* — Omer S Mian
(74) *Attorney, Agent, or Firm* — Fujitsu Patent Center

(57) ABSTRACT

When a plurality of radio signals having different sub frame lengths are transmitted on the same radio carrier, a radio signal of a short sub frame length is arranged inside a carrier band, and a radio signal of a sub frame length longer than the sub frame length of the short sub frame length signal is arranged outside the carrier band.

6 Claims, 19 Drawing Sheets

(56) References Cited

U.S. PATENT DOCUMENTS

| | | | |
|---|---|---|---|
| 2009/0190570 A1* | 7/2009 | Marath | H04L 5/02 370/350 |
| 2009/0316611 A1* | 12/2009 | Stratford | H04J 3/0608 370/294 |
| 2010/0002655 A1* | 1/2010 | Ofuji | H04J 13/0059 370/335 |
| 2010/0111047 A1* | 5/2010 | Yang | H04W 52/0216 370/336 |
| 2010/0226320 A1 | 9/2010 | Asanuma | |
| 2010/0322184 A1* | 12/2010 | Xiao | G01S 1/20 370/330 |
| 2011/0002293 A1* | 1/2011 | Yuk | H04W 72/0406 370/329 |
| 2011/0007831 A1* | 1/2011 | Moon | H04L 5/0007 375/260 |
| 2011/0026461 A1* | 2/2011 | Tee | H04L 5/0007 370/328 |
| 2011/0026627 A1* | 2/2011 | Chun | H04L 5/0007 375/260 |
| 2011/0041027 A1* | 2/2011 | Fong | H04L 1/1812 714/749 |
| 2011/0081913 A1* | 4/2011 | Lee | H04L 5/003 455/450 |
| 2011/0310837 A1 | 12/2011 | Classon et al. | |
| 2012/0140720 A1 | 6/2012 | Nishio et al. | |
| 2012/0188986 A1 | 7/2012 | Kawasaki et al. | |
| 2012/0236803 A1* | 9/2012 | Vujcic | H04W 72/048 370/329 |
| 2012/0320854 A1* | 12/2012 | Sumasu | H04J 11/0056 370/329 |
| 2013/0058233 A1* | 3/2013 | Kim | H04L 5/001 370/252 |
| 2013/0176952 A1* | 7/2013 | Shin | H04L 5/001 370/329 |
| 2014/0098785 A1* | 4/2014 | Frenne | H04L 5/0007 370/330 |
| 2014/0133423 A1* | 5/2014 | Froberg Olsson | H04L 5/0053 370/329 |

FOREIGN PATENT DOCUMENTS

| | | |
|---|---|---|
| WO | 2007/080892 A1 | 7/2007 |
| WO | 2008/038367 A1 | 4/2008 |

* cited by examiner

RADIO SIGNAL TRANSMISSION METHOD, RADIO SIGNAL TRANSMITTING DEVICE, RADIO SIGNAL RECEIVING DEVICE, RADIO BASE STATION DEVICE AND RADIO TERMINAL DEVICE

CROSS-REFERENCE TO RELATED APPLICATION

This application is a continuation application of International Application PCT/JP2011/72270, filed on Sep. 28, 2011 and designated the U.S., the entire contents of which are incorporated herein by reference.

FIELD

The embodiments discussed herein are directed to a radio signal transmission method, a radio signal transmitting device, a radio signal receiving device, a radio base station device, and a radio terminal device.

BACKGROUND

In a down link radio section of a long term evolution (LTE) whose specification is being developed in 3rd generation partnership project (3GPP), transmission of radio data from a radio base station to a mobile radio terminal is performed using a radio sub frame having a length of 1 ms as a basic unit.

In this system, a radio sub frame is configured with 14 (or 12) OFDM symbols, a control signal is transmitted using one to three OFDM symbols in the head of each radio sub frame, and a data signal is transmitted using the remaining OFDM symbols.

The control signal includes information used when the mobile radio terminal receives the data signal. Specifically, the control signal includes frequency domain information in which the data signal is arranged, information such as a modulation scheme, a code rate, and a hybrid automatic repeat request (HARQ) which are applied to the data signal, and the like.

FIGS. 1 and 2 are diagrams illustrating exemplary configurations of a transmitting device equipped in a radio base station and a receiving device equipped in a mobile radio terminal according to a related art.

As illustrated in FIG. 1, in a transmitting device 100, a data signal generated by a data signal generator 101 and a control signal generated by a control signal generator 102 are time-multiplexed by a time multiplexer 103, so that a radio sub frame including the data signal and the control signal is configured.

Then, the radio sub frame is subjected to a certain modulation process and a radio transmission process (for example, an up converting process) in a modulating/RF unit 104 and then transmitted to the mobile radio terminal through a transmitting antenna 105.

Meanwhile, in a receiving device 200 of the mobile radio terminal, as illustrated in FIG. 2, a radio signal received through a receiving antenna 201 is subjected to a certain demodulation process and a radio reception process (for example, a down converting process) in an RP/demodulating unit 202 and then time-demultiplexed by a time demultiplexer 203.

A control signal extractor 205 extracts a control signal from an output from the time demultiplexer 203, and outputs the control signal to a data signal extractor 204.

The data signal extractor 204 extracts a data signal from an output from the time demultiplexer 203 based on the control signal output from the control signal extractor 205, and outputs the data signal.

In recent years, mobile communication systems have been continuously developed, and it is preferred to increase a data transmission peak rate and a data transmission throughput while reducing a data transmission delay.

As a technique of reducing a data transmission delay, a technique of reducing a length of the radio sub frame is effective (see FIG. 3A).

However, since a control signal has the size of a fixed value although a length of a radio sub frame is reduced, as a length of a radio sub frame decreases, a ratio at which the control signal occupies in the radio sub frame increases, and a ratio of an area that can be used for transmission of the data signal decreases.

For this reason, as a length of a radio sub frame decreases, data transmission efficiency deteriorates.

Meanwhile, when a length of a radio sub frame is increased, data transmission efficiency is improved, but a delay increases due to data processing such as retransmission control (see FIG. 3B).

In other words, the data transmission efficiency and the data transmission delay have a trade-off relation according to a change in the length of the radio sub frame.

As described above, as mobile communication systems have been continuously developed, opportunities to transmit data of a large size increase, and data that is severe in a required transmission delay characteristic but is not large in the size such as audio data is transmitted as well.

As described above, a preferred transmission rate or a required transmission delay characteristic differs according to data to be transmitted, and thus it is preferable to select an optimal transmission method according to the nature of data.

Thus, it is one of problems to efficiently transmit various kinds of data having different required characteristics in the same radio section.

As a solution approach to solve the problem, a technique of time-multiplexing and transmitting radio sub frames of different lengths on the same carrier has been known (see Patent Reference 1).

Patent Reference 1: Japanese National Publication of International Patent Application No. 2008-535391

FIG. 4 is a diagram illustrating a structure in which radio sub frames of different lengths are time-multiplexed.

When a radio sub frame of a length different from a radio sub frame of a length specified in an existing system is time-multiplexed, a mobile radio terminal designated based on an existing specification can receive only data transmitted through the radio sub frame of the length specified in the existing system.

For example, when a radio sub frame longer than a radio sub frame of an existing specification is newly introduced, a mobile radio terminal designated based on the existing specification is unable to receive data transmitted through the newly introduced long radio sub frame.

In other words, a time zone in which the radio base station is unable to transmit data to the mobile radio terminal designed based on the specification of the existing system occurs, and transmission efficiency of the system deteriorates. For this reason, this approach is inefficient.

As another solution approach to solve the above problem, a technique of transmitting radio sub frames of different lengths on different radio carriers is considered. The radio base station selects a radio carrier to be used to transmit data according to the nature of data to be transmitted. In this case, the mobile radio terminal constantly monitors a plurality of radio carriers in order to be capable of receiving data transmitted through any of the plurality of radio carriers, and thus a processing load of the mobile radio terminal increases.

SUMMARY (1) As a first solution, provided is a radio signal transmission method which includes, when a plurality of radio signals having different sub frame lengths are transmitted on the same radio carrier, arranging a radio signal of a short sub frame length (hereinafter, referred to as a "short sub frame length signal") inside a carrier band, and arranging a radio signal of a sub frame length (hereinafter, referred to as a "long sub frame length signal") longer than the sub frame length of the short sub frame length signal outside the carrier band.

(2) As a second solution, provided is a radio signal transmission method which includes, when an existing radio signal having a certain sub frame length and a new radio signal having a sub frame length different from the sub frame length of the existing radio signal are transmitted together on the same radio carrier, arranging the existing radio signal inside a carrier band and arranging the new radio signal outside the carrier band.

(3) As a third solution, provided is a radio signal transmitting device that transmits a plurality of radio signals having different sub frame lengths on the same radio carrier which includes a short sub frame length signal generator that generates a radio signal of a short sub frame length (hereinafter, referred to as a "short sub frame length signal"), a long sub frame length signal generator that generates a radio signal of a sub frame length (hereinafter, referred to as a "long sub frame length signal") longer than the sub frame length of the short sub frame length signal, and a signal multiplexer that performs time multiplexing and frequency multiplexing on the short sub frame length signal and the long sub frame length signal such that the short sub frame length signal generated by the short sub frame length signal generator is arranged inside a carrier band, and the long sub frame length signal generated by the long sub frame length signal generator is arranged outside the carrier band.

(4) As a fourth solution, provided is a radio signal transmitting device that transmits an existing radio signal having a certain sub frame length and a new radio signal having a sub frame length different from the sub frame length of the existing radio signal together on the same radio carrier, which includes an existing radio signal generator that generates the existing radio signal, a new radio signal generator that generates the new radio signal, and a signal multiplexer that performs time multiplexing and frequency multiplexing on the existing radio signal and the new radio signal such that the existing radio signal generated by the existing radio signal generator is arranged inside a carrier band, and the new radio signal generated by the new radio signal generator is arranged outside the carrier band.

(5) As a fifth solution, provided is a radio signal receiving device that receives either of the short sub frame length signal and the long sub frame length signal from the radio signal transmitting device, which includes a signal demultiplexer that performs time demultiplexing and frequency demultiplexing on the short sub frame length signal and the long sub frame length signal, a control information extractor that extracts control information related to the short sub frame length signal and control information related to the long sub frame length signal from a signal demultiplexed by the signal demultiplexer, and a signal extractor that extracts the short sub frame length signal and the long sub frame length signal based on the control information extracted by the control information extractor.

(6) As a sixth solution, provided is a radio signal receiving device that receives either of the existing radio signal and the new radio signal from the radio signal transmitting device, which includes a signal demultiplexer that performs time demultiplexing and frequency demultiplexing on the existing radio signal and the new radio signal, a control information extractor extracts control information related to the existing radio signal and control information related to the new radio signal from a signal demultiplexed by the signal demultiplexer, and a signal extractor that extracts the existing radio signal and the new radio signal based on the control information extracted by the control information extractor.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Hereinafter, exemplary embodiments of the present disclosure will be described with reference to the appended drawings. The following embodiments are merely exemplary and not intended to exclude applications of various changes or techniques which are not set forth in the following embodiments and modifications thereof. In other words, various changes can be made on the following embodiments and modifications thereof within the scope not departing from the gist of the present disclosure.

[1] First Embodiment

The present embodiment will be described in connection with an example in which a signal having a radio sub frame longer than a signal (an existing radio signal) having a radio sub frame according to the existing specification is newly introduced.

In the following, a signal having a short radio sub frame specified in the existing specification is also referred to as a "short sub frame length signal" or "existing radio signal." Further, a signal having a long radio sub frame which is newly introduced is also referred to as a "long sub frame length signal" or "new radio signal."

Figure 1:
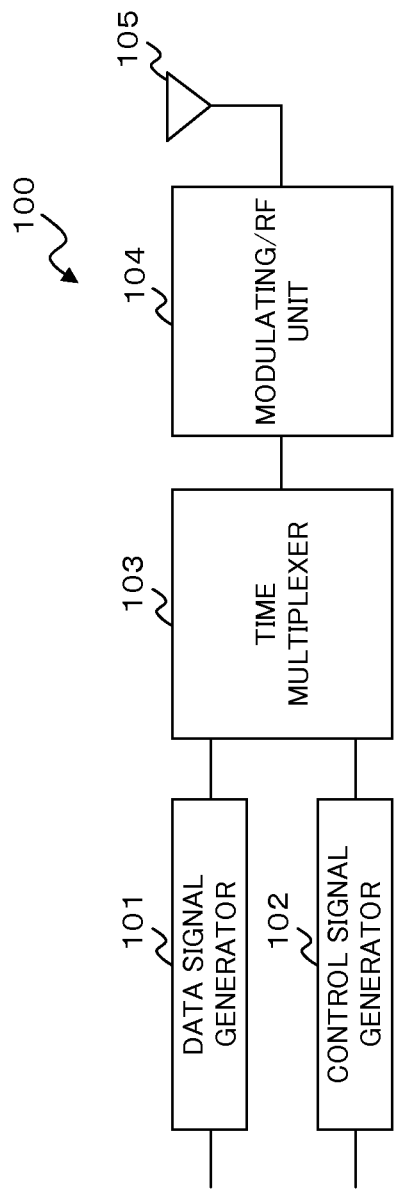
FIG. 1 is a diagram illustrating an exemplary configuration of a transmitting device equipped in a radio base station according to a related art.
Figure 2:
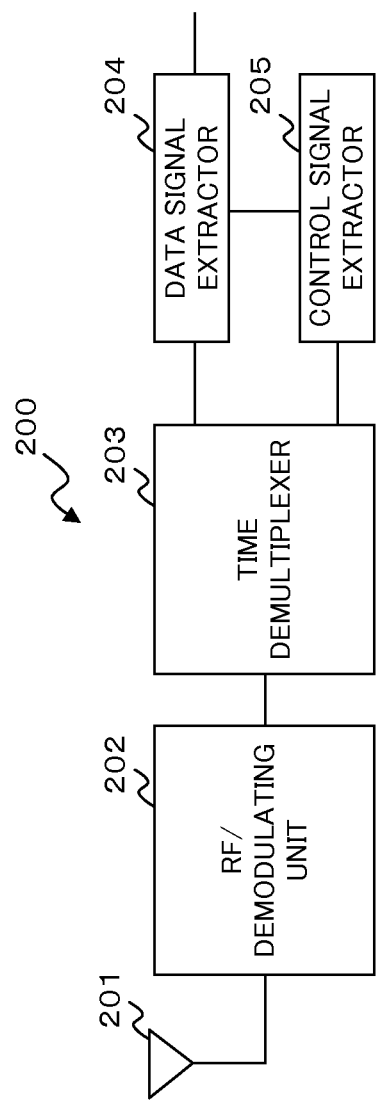
FIG. 2 is a diagram illustrating an exemplary configuration of a receiving device equipped in a mobile radio terminal according to a related art.
Figure 3:
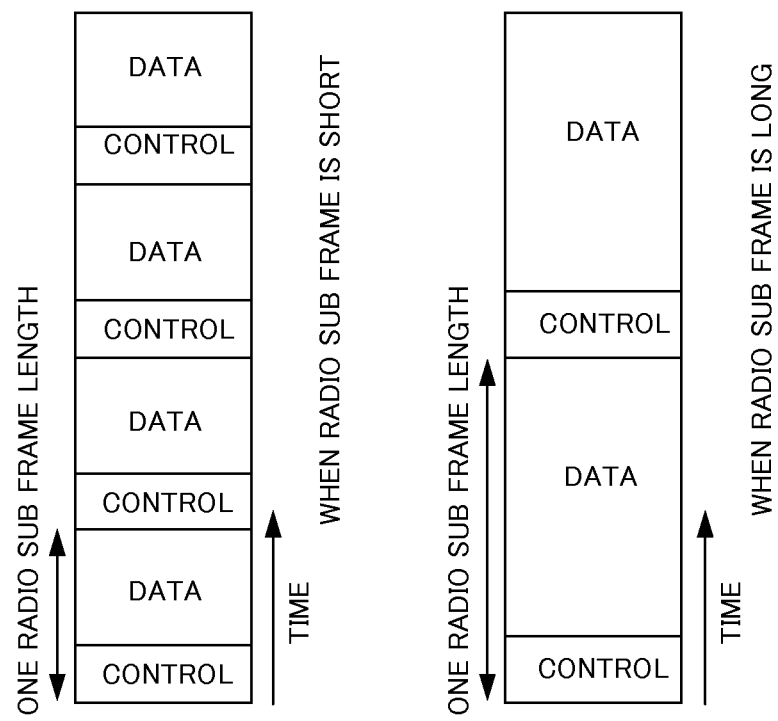
FIGS. 3A and 3B are diagrams illustrating exemplary configurations of a radio sub frame.
Figure 4:
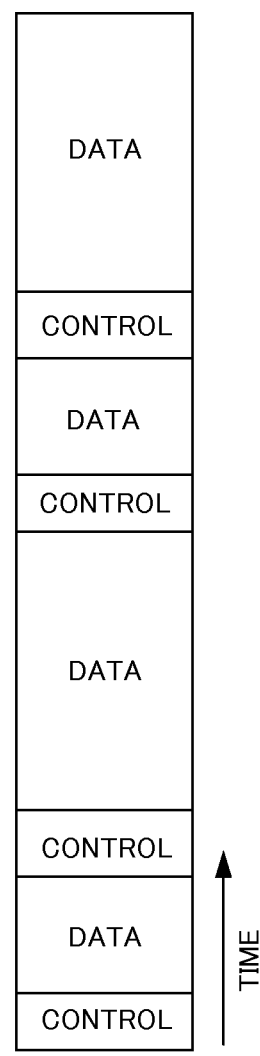
FIG. 4 is a diagram illustrating an exemplary configuration in which sub frames of different lengths are time-multiplexed.
Figure 5:
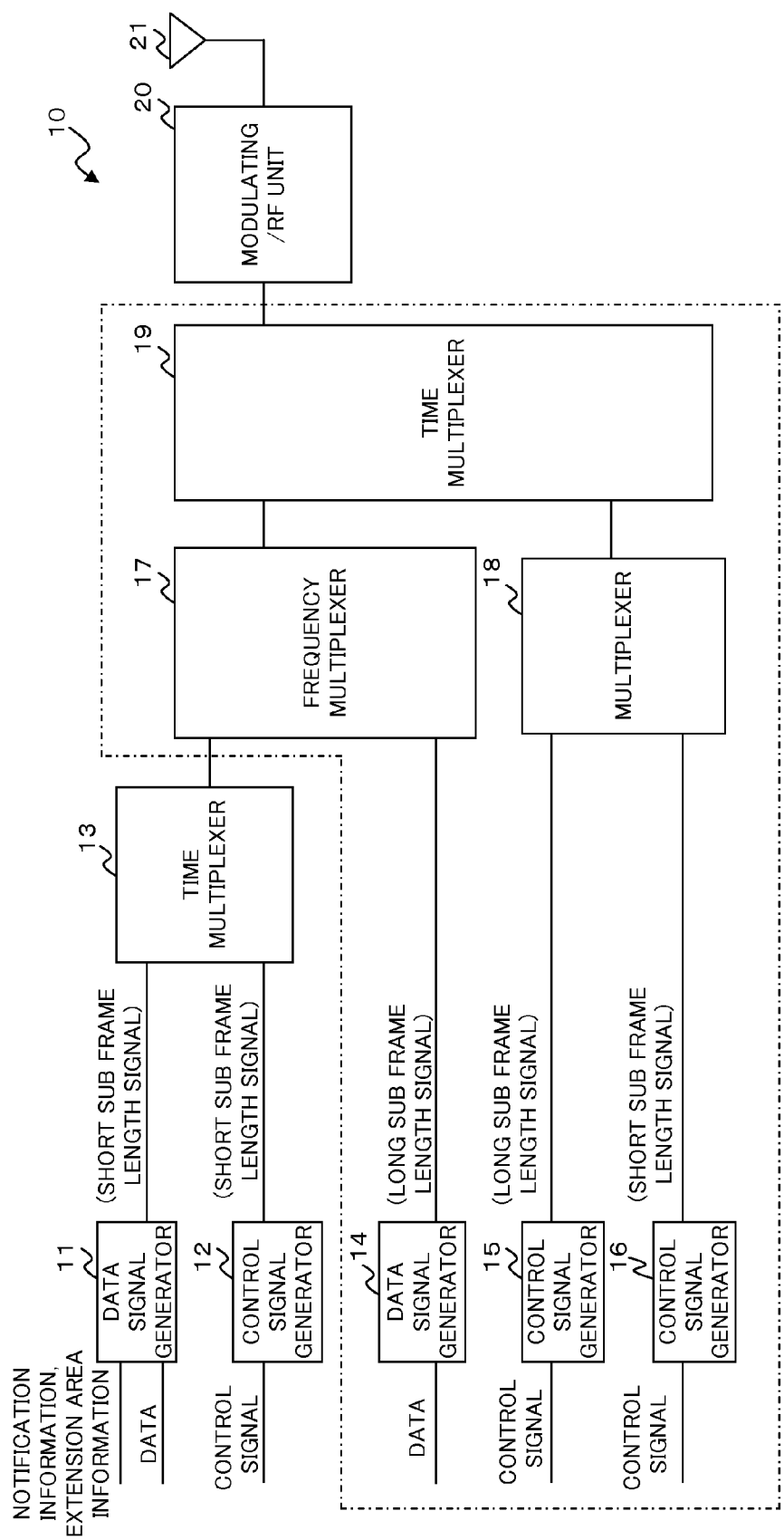
FIG. 5 is a diagram illustrating an exemplary configuration of a transmitting device according to a first embodiment.

FIG. 5 is a diagram illustrating a configuration of a transmitting device according to a first embodiment.

For example, a transmitting device 10 illustrated in FIG. 5 includes data signal generators 11 and 14, control signal generators 12, 15, and 16, time multiplexers 13 and 19, a frequency multiplexer 17, a multiplexer 18, a modulating/RF unit 20, and a transmitting antenna 21.

The data signal generator 11 generates a data signal of a short sub frame length signal, and the control signal generator 12 generates a control signal associated with transmission of the data signal of the short sub frame length signal generated in the data signal generator 11.

In other words, the data signal generator 11 and the control signal generator 12 function as an example of a short sub frame length signal generator that generates a radio signal of a short sub frame length.

Further, generation of the data signal and generation of the control signal associated with transmission of the generated data signal are performed for each radio terminal device, and data for one or more radio terminal devices is transmitted through one short sub frame. The data signal generator 11 and the control signal generator 12 generate the data signal and the control signal for one or more radio terminal devices for each sub frame.

For example, the control signal includes information used when the mobile radio terminal receives the data signal. Specifically, the control signal includes frequency domain information in which the data signal is arranged, information such as a modulation scheme, a code rate, and hybrid automatic repeat request (HARQ) information which are applied to the data signal, and the like. The frequency domain information represents a frequency position at which data is transmitted in a transmission area of a short sub frame length signal (existing radio signal) (or a transmission area of a long sub frame length signal (new radio signal)), but among blocks of equal intervals obtained by dividing the entire bandwidth of the transmission area of the short sub frame length signal (existing radio signal), a block that data to be transmitted occupies may be represented using a bit map or the like.

Information related to a frequency width of the transmission area of the short sub frame length signal (existing radio signal) is shared by all radio terminal devices, but the information is included in a notification signal (notification information) repetitively transmitted at certain time intervals and transmitted from a radio base station device. In the drawings illustrated in the present specification, the notification signal is not described. In the 3GPP LTE system, the notification signal including the information related to the entire frequency width of the transmission area of the short sub frame length signal is transmitted using a physical channel such as a physical broadcast channel (PBCH). Further, the content of the control signal is similar in the following.

The data signal generated in the data signal generator 11 and the control signal generated in the control signal generator 12 are time-multiplexed in the time multiplexer 13, so that a short sub frame length signal is configured.

The data signal generator 14 generates a data signal of a long sub frame length signal having a certain size, and the control signal generator 15 generates a control signal associated with transmission of the data signal of the long sub frame length signal generated in the data signal generator 14. In other words, the data signal generator 14 and the control signal generator 15 function as an example of a long sub frame length signal generator that generates a radio signal of a long sub frame length signal longer than a sub frame length of the short sub frame length signal. Further, the control signal generator 16 is able to generate a control signal associated with transmission of the data signal of the short sub frame length signal generated in the data signal generator 11, and functions as an example of the short sub frame length signal generator.

Further, the data signal generator 14 attaches the notification information or extension area information related to specification of a newly introduced radio sub frame such as the certain size or the bandwidth to the data signal. The extension area information need not be attached to the data signal each time the data signal is transmitted, and may be attached to data and transmitted when data is transmitted to a terminal that can use a newly introduced extension area for the first time, and further, when any of parameters related to an extension area part is changed. Alternatively, only information related to the extension area may be separately transmitted to a radio terminal device on the extension area without being attached to data.

Information related to the entire frequency bandwidth of a radio carrier including both the transmission area and the extension area of the short sub frame length signal (existing radio signal) is transmitted on the transmission area of the short sub frame length signal (existing radio signal).

When a radio terminal device capable of using the extension area in addition to the transmission area of the short sub frame length signal (existing radio signal) performs an operation of accessing a radio base station device for the first time, the radio terminal device recognizes the transmission area part of the short sub frame length signal (existing radio signal) arranged inside the carrier, and obtains basic information such as the presence of the extension area or the size of the extension area through one of two or more types of notification signals transmitted on the area.

The radio base station notifies the radio terminal device capable of using the extension area in addition to the transmission area of the short sub frame length signal (existing radio signal) of whether data transmission to the corresponding radio terminal device using the extension area is to be performed through a control signal of a different type from a control signal transmitted in association with a data signal.

The radio terminal device that has received notification as to whether the extension area is to be used starts to monitor the control signal transmitted to spread in the entire frequency band of the radio carrier, and monitors the control signal of each sub frame unless a special operation state such as an intermittent data transmission operation is newly set.

Further, the control signal need not necessarily be spread from one end of the entire frequency band of the radio carrier to the other end and transmitted, and for example, may be spread in one extension area, two extension areas from one extension area to another extension area beyond the transmission area of the short sub frame length signal (existing radio signal), or both one extension area and the transmission area of the short sub frame length signal (existing radio signal) and transmitted. Notification of a transmission form is separately given from the radio base station to the radio terminal device in advance through the control signal or the notification signal.

The data generated in the data signal generator 14 and the control signal generated in the control signal generator 15 are output to the frequency multiplexer 17 and the multiplexer 18, respectively.

The frequency multiplexer 17 frequency-multiplexes the output signal of the time multiplexer 13 and the output signal of the data signal generator 14.

The multiplexer 18 multiplexes the control signals output from the control signal generators 15 and 16.

The time multiplexer 19 time-multiplexes the output signal of the frequency multiplexer 17 and the output signal of the multiplexer 18.

Through collaboration of the time multiplexers 13 and 19 and the frequency multiplexer 17, a long sub frame length signal is arranged (mapped) outside the short sub frame length signal in the frequency domain. In other words, the time multiplexers 13 and 19 and the frequency multiplexer 17 function as an example of a signal multiplexer that performs time multiplexing and frequency multiplexing on the short sub frame length signal and the long sub frame length signal such that the short sub frame length signal generated by the short sub frame length signal generator is arranged inside the carrier band, and the long sub frame length signal generated by the long sub frame length signal generator is arranged outside the carrier band.

Typically, control signals and data signals for a plurality of mobile terminals are mapped on a single radio sub frame. For this reason, mapping is performed such that control signals for a plurality of mobile terminals are associated with one to three OFDM symbols in the head of the radio sub frame.

Further, for example, each control signal can be mapped throughout the entire bandwidth of a down link radio carrier so that a maximum frequency diversity gain is obtained.

Thus, in the present embodiment, the time multiplexers 13 and 19 and the frequency multiplexer 17 arrange the control signal related to the short sub frame length signal throughout the entire transmission band of the short sub frame length signal, and arrange the control signal related to the long sub frame length signal throughout the entire transmission band of the long sub frame length signal including the transmission band of the short sub frame length signal.

Further, the mobile terminal needs a synchronous signal in order to acquire synchronization with the radio carrier, but the time multiplexers 13 and 19 and the frequency multiplexer 17 arrange a synchronous signal having a signal pattern (or a code sequence) known to the radio terminal device in the center of the carrier band. The synchronous signal is repetitively transmitted at a certain time period. In 3GPP LTE system, an identification number of a radio cell (or sector) formed by the radio base station device is associated with the code sequence of the synchronous signal.

The modulating/RF unit 20 performs a certain modulation process and a radio transmission process (for example, an up-converting process) on the signal output from the time multiplexer 19, and outputs the resultant signal to the transmitting antenna 21.

Figure 6:
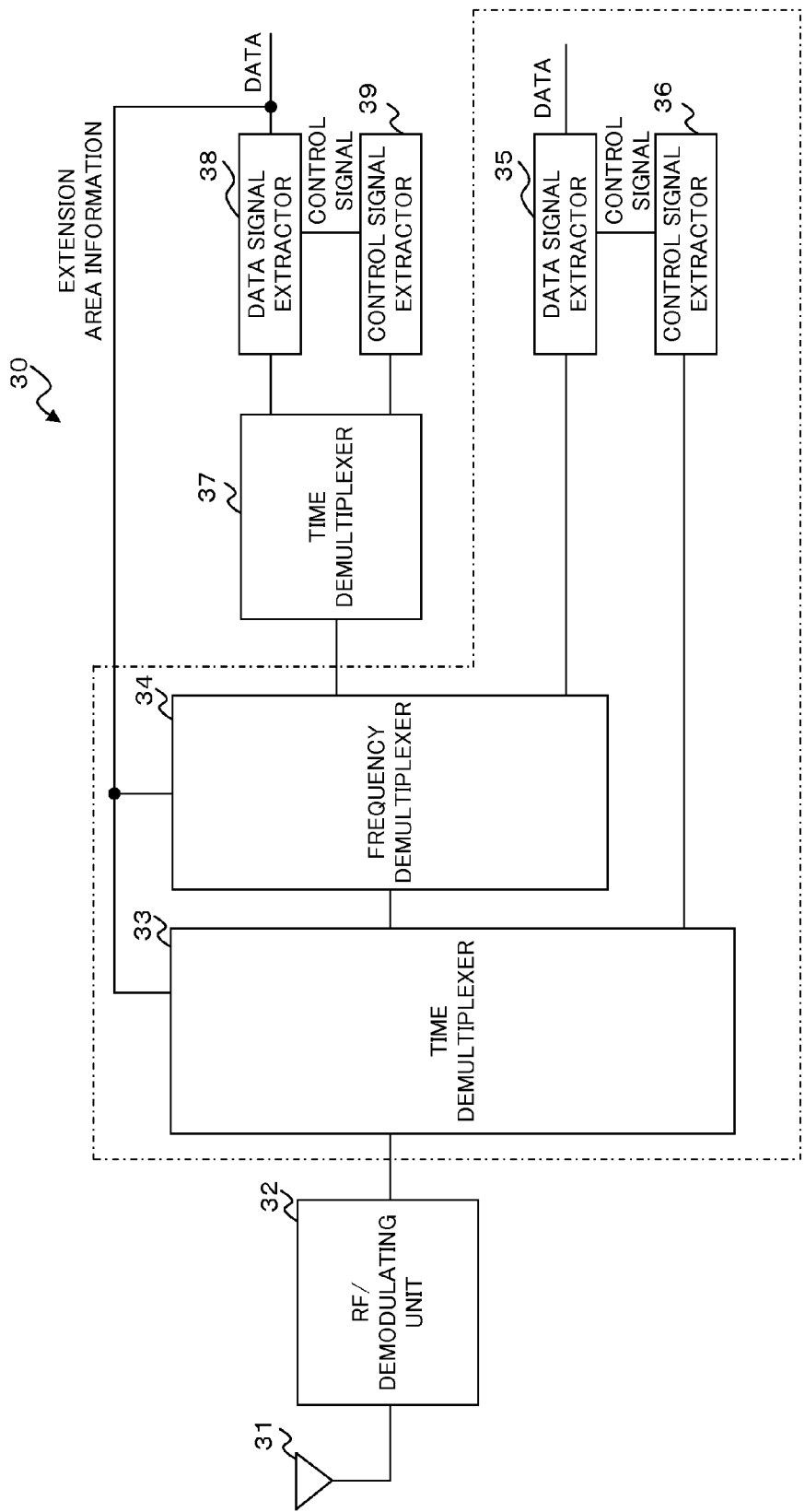
FIG. 6 is a diagram illustrating an exemplary configuration of a receiving device according to the first embodiment.

FIG. 6 is a diagram illustrating a configuration of the receiving device according to the first embodiment.

For example, a receiving device 30 illustrated in FIG. 6 includes a receiving antenna 31, an RF/demodulating unit 32, time demultiplexers 33 and 37, a frequency demultiplexer 34, data signal extractors 35 and 38, and control signal extractors 36 and 39.

A radio signal received by the receiving antenna 31 is subjected to a certain radio reception process (for example, a down-converting process) and a demodulation process in the RF/demodulating unit 32 and then time-demultiplexed in the time demultiplexer 33.

The output signal of the time demultiplexer 33 is frequency-demultiplexed in the frequency demultiplexer 34.

The output signal of the frequency demultiplexer 34 is time-demultiplexed in the time demultiplexer 37.

In other words, the time demultiplexers 33 and 37 and the frequency demultiplexer 34 function as an example of a signal demultiplexer that performs time demultiplexing and frequency demultiplexing on the short sub frame length signal and the long sub frame length signal.

The control signal extractor 36 extracts the control signal of the long sub frame length signal from the output of the time demultiplexer 33, and outputs the extracted control signal to the data signal extractor 35.

The data signal extractor 35 extracts the data signal of the long sub frame length signal based on the control signal of the long sub frame length signal output from the control signal extractor 36 from the output of the frequency demultiplexer 34.

The control signal extractor 39 extracts the control signal of the short sub frame length signal from the output of the time demultiplexer 37, and outputs the extracted control signal to the data signal extractor 38.

The data signal extractor 38 extracts the data signal of the short sub frame length signal and the extension area information from the output of the time demultiplexer 37 based on the control signal output from the control signal extractor 39.

In other words, the control signal extractors 36 and 39 function as an example of a control information extractor that extracts control information related to the short sub frame length signal and control information related to the long sub frame length signal from the signal demultiplexed by the signal demultiplexer, and the data signal extractors 35 and 38 function as an example of a signal extractor that extracts the short sub frame length signal and the long sub frame length signal based on the control information extracted by the control information extractor.

In the example illustrated in FIG. 6, the extension area information extracted by the data signal extractor 38 is input to the time demultiplexer 33 and the frequency demultiplexer 34, and the time demultiplexer 33 and the frequency demultiplexer 34 perform time demultiplexing and frequency demultiplexing based on the extension area information, so that the long sub frame length signal is output.

The data signal generators 11 and 14, the control signal generators 12, 15 and 16, the time multiplexers 13 and 19, the frequency multiplexer 17, and the multiplexer 18 which are equipped in the transmitting device 10, and the time demultiplexers 33 and 37, the frequency demultiplexer 34, the data signal extractors 35 and 38, and the control signal extractors 36 and 39 which are equipped in the receiving device 30 may be configured using a digital signal processor (DSP), a central processing unit (CPU), or the like appropriately.

The modulating/RF unit 20 and the RF/demodulating unit 32 may be configured by a combination of various kinds of analog circuits and digital circuits appropriately.

Figure 7:
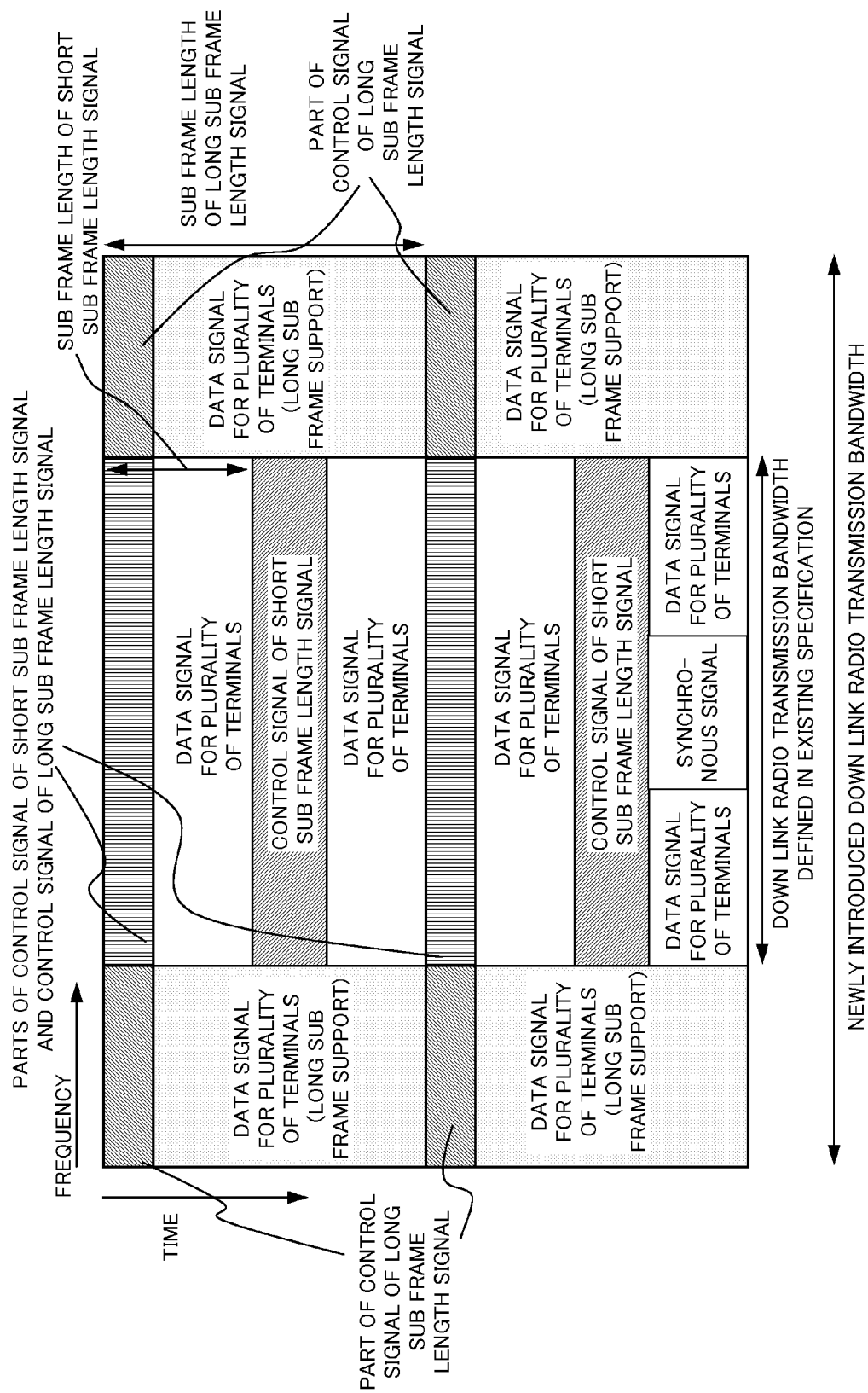
FIG. 7 is a diagram illustrating exemplary mapping according to the first embodiment.

FIG. 7 is a diagram illustrating exemplary mapping according to the first embodiment.

In the example illustrated in FIG. 7, a short sub frame length signal is mapped in a down link radio transmission band (which is hereinafter referred to as an "existing band" as well) defined in the existing specification, and a long sub frame length signal is mapped on both sides thereof.

Further, for example, the control signal related to the short sub frame length signal is mapped in the existing band, and thus a mobile radio terminal (which is hereinafter referred to as an "existing terminal" as well) designated according to the existing specification can receive only the short sub frame length signal as in the related art by monitoring only the existing band and performing the reception process.

Meanwhile, for example, as the control signal related to the long sub frame length signal is mapped throughout the entire carrier band, and thus a mobile radio terminal (which is represented by long sub frame support in FIG. 7 and may be hereinafter referred to as a "new terminal") capable of receiving both the long sub frame length signal (new radio signal) and the short sub frame length signal (existing radio signal) can receive both the long sub frame length signal (new radio signal) and the short sub frame length signal (existing radio signal) by monitoring the entire carrier band and performing the reception process. As described above, the control signal need not necessarily be spread from one end of the entire frequency band of the radio carrier to the other end and be transmitted, and for example, may be spread in one extension area, two extension areas from one extension area to another extension area beyond the transmission area of the long sub frame length signal (existing radio signal), or in both one extension area and the transmission area of the long sub frame length signal (existing radio signal) and be transmitted. The new terminal is designed to be able to monitor and receive the control signal transmitted in the above-described way.

In other words, the radio terminal device capable of receiving only the short sub frame length signal (existing radio signal) monitors the control signal transmitted through an inside part of the carrier band, and the radio terminal device capable of receiving both the short sub frame length signal and the long sub frame length signal monitors the control signal transmitted through the entire carrier and the control signal transmitted through the inside of the carrier band.

Further, data to be decoded by the radio terminal device according to the content of the received and decoded control signal is transmitted from the radio base station device to the radio terminal device using the inside part of the carrier band when the radio terminal device is capable of receiving only the short sub frame length signal (existing radio signal) or using the entire carrier band when the radio terminal device is capable of receiving both the short sub frame length signal and the long sub frame length signal.

As described above, the transmission area of the short sub frame length signal (existing radio signal) is a band which can be used for data transmission to the existing terminal and the new terminal, and a common control signal used for transmission of system information or the like is transmitted through this band. Meanwhile, the transmission area of the long sub frame length signal (new radio signal) other than the inside of the carrier band need not necessarily be used for transmission of the common control signal.

Thus, a common pilot signal (or a reference signal) used in all mobile radio terminals for demodulation of a data signal or a control signal, or quality evaluation of a radio section between a radio base station and a mobile radio terminal may be transmitted only through the inside of the carrier band, and only an individual pilot signal rather than the common pilot signal may be transmitted through an area through which the long sub frame length signal (new radio signal) is transmitted.

In this case, in the area through which only the long sub frame length signal (new radio signal) is transmitted, for example, depending on the moving speed of the mobile radio terminal, an arrangement density or an arrangement pattern of pilot signals may be changed, and a type of a code or a code sequence configuring a pilot signal or a signal (for example, a scramble signal or an identification code of a mobile radio terminal) used for modulation of a pilot signal may be changed.

As a form of a pilot signal is changed between the transmission area of the short sub frame length signal (existing radio signal) and the transmission area of the long sub frame length signal (new radio signal), a merit obtained by changing a sub frame length according to a type of data to be transmitted increases.

Further, since the synchronous signal is mapped to be arranged in the central part in both the existing band and the carrier band, both the existing terminal and the new terminal can acquire the synchronous signal by referring to the center of the monitored band.

Through the above-described configuration, it is possible to introduce the mobile radio terminal capable of using radio sub frames of different lengths according to the nature of data without influencing the mobile radio terminal designed according to the existing specification.

Further, in the LTE specification of the related art, the control signals are mapped with a certain arrangement throughout the entire transmission band, but in the present embodiment, since the control signals are not intermittent on the frequency axis, compatibility with the LTE specification of the related art is good.

Further, since the synchronous signal is mapped to be arranged in the center in both the existing band and the carrier band, the synchronous signal can be used by both the existing terminal and the new terminal, and since synchronous signals need not be set separately for the existing terminal and the new terminal, the transmission band can be efficiently used, and the design cost of the terminal can be reduced.

[2] Second Embodiment

The present embodiment will be described in connection with an example in which a signal having a radio sub frame having a sub frame length shorter than a signal having a radio sub frame according to the existing specification is newly introduced.

Figure 8:
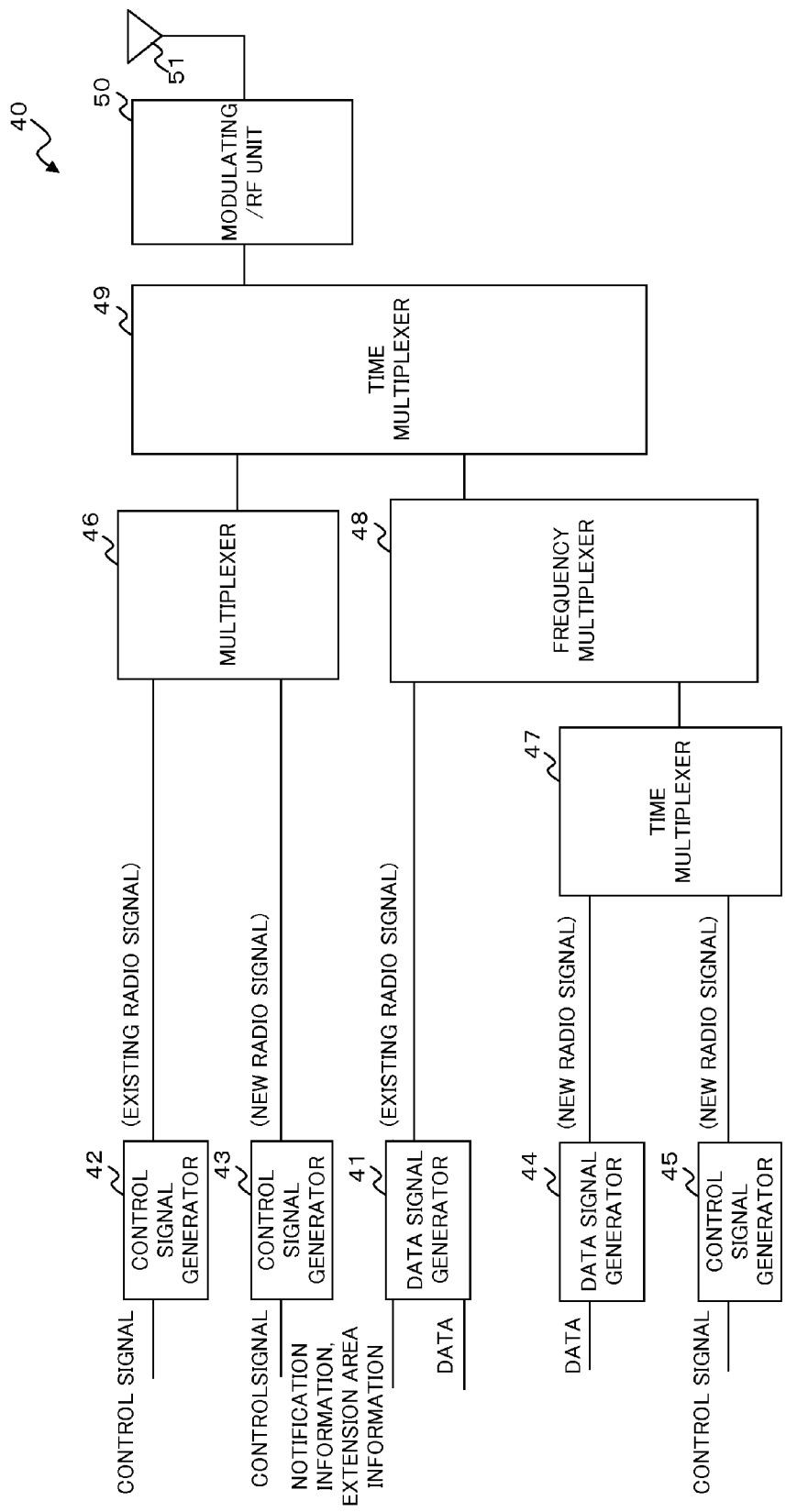
FIG. 8 is a diagram illustrating an exemplary configuration of a transmitting device according to a second embodiment.

FIG. 8 is a diagram illustrating a configuration of a transmitting device according to a second embodiment.

For example, a transmitting device 40 illustrated in FIG. 8 includes data signal generators 41 and 44, control signal generators 42, 43 and 45, a multiplexer 46, time multiplexers 47 and 49, a frequency multiplexer 48, a modulating/RF unit 50, and a transmitting antenna 51.

The data signal generator 41 generates a data signal of a signal (which is hereinafter referred to as an "existing radio signal" as well) having a radio sub frame of a sub frame length defined in the existing specification.

The data signal generator 41 attaches notification information or extension area information related to a specification of a newly introduced radio sub frame to the data signal. The notification information and the extension area information are the same as in the first embodiment, and thus a detailed description thereof will be omitted.

The control signal generator 42 generates a control signal associated with transmission of the data signal of the existing radio signal generated in the data signal generator 41.

The control signal of the existing radio signal includes information related to the frequency width of the existing band as the frequency domain information, and is transmitted to the mobile radio terminal capable of receiving only the existing radio signal.

In other words, the data signal generator 41 and the control signal generator 42 function as an example of an existing radio signal generator that generates an existing radio signal.

The data signal generator 44 generates a data signal of a newly introduced signal (which is hereinafter referred to as a "new radio signal" as well) having a radio sub frame of a length shorter than a sub frame length defined in the existing specification. The data signal generator 44 can generate extension area information related to a specification of a newly introduced radio sub frame such as a sub frame length and attach the extension area information to the data signal.

The control signal generator 45 generates a control signal associated with transmission of the data signal of the new radio signal generated in the data signal generator 44.

The control signal of the new radio signal includes information related to the frequency width of the existing band and information related to the frequency width in the transmission area of the new radio signal as the frequency domain information, and is transmitted to the mobile radio terminal capable of receiving both the new radio signal and the existing radio signal.

In other words, the data signal generator 44 and the control signal generator 45 function as an example of a new radio signal generator that generates a new radio signal.

The control signal generator 43 can generate a control signal associated with transmission of a new radio signal and functions as an example of the new radio signal generator.

The output signals of the control signal generators 42 and 43 are multiplexed by the multiplexer 46, and are output to the time multiplexer 49.

The data signal generated in the data signal generator 41 is output to the frequency multiplexer 48.

The time multiplexer 47 time-multiplexes the output signal of the data signal generator 44 and the output signal of the control signal generator 45.

The frequency multiplexer 48 frequency-multiplexes the output signal of the time multiplexer 47 and the output signal of the data signal generator 41.

The time multiplexer 49 time-multiplexes the output signal of the frequency multiplexer 48 and the output signal of the multiplexer 46.

Through collaboration of the time multiplexers 47 and 49 and the frequency multiplexer 48, the new radio signal is mapped outside the existing radio signal in the frequency domain.

In other words, the time multiplexers 47 and 49 and the frequency multiplexer 48 function as an example of a signal multiplexer that performs time multiplexing and frequency multiplexing on the existing radio signal and the new radio signal such that the existing radio signal generated in the existing radio signal generator is arranged inside the carrier band, and the new radio signal generated by the new radio signal generator is arranged outside the carrier band.

Further, in the present embodiment, the time multiplexers 47 and 49 and the frequency multiplexer 48 arrange the control signal related to the existing radio signal over the transmission band of the existing radio signal, and arranges the control signal related to the new radio signal over the transmission band of the new radio signal. The control signals need not necessarily be arranged to spread from one end of the respective transmission bands to the other end thereof. Further, for example, the control signal of the new radio signal may be spread in one extension area, two extension areas from one extension area to another extension area beyond the existing signal area, or both one extension area and the existing area, and be transmitted.

Further, the time multiplexers 47 and 49 and the frequency multiplexer 48 arranges the synchronous signal having a signal pattern (or a code sequence) known to the radio terminal device in the center of the carrier band of the existing radio signal and the new radio signal. The synchronous signal is the same as in the first embodiment, and thus a detailed description thereof will be omitted.

The modulating/RF unit 50 performs a certain modulation process and a radio transmission process (for example, an up-converting process) on the signal output from the time multiplexer 49, and outputs the resultant signal to the transmitting antenna 51.

Figure 9:
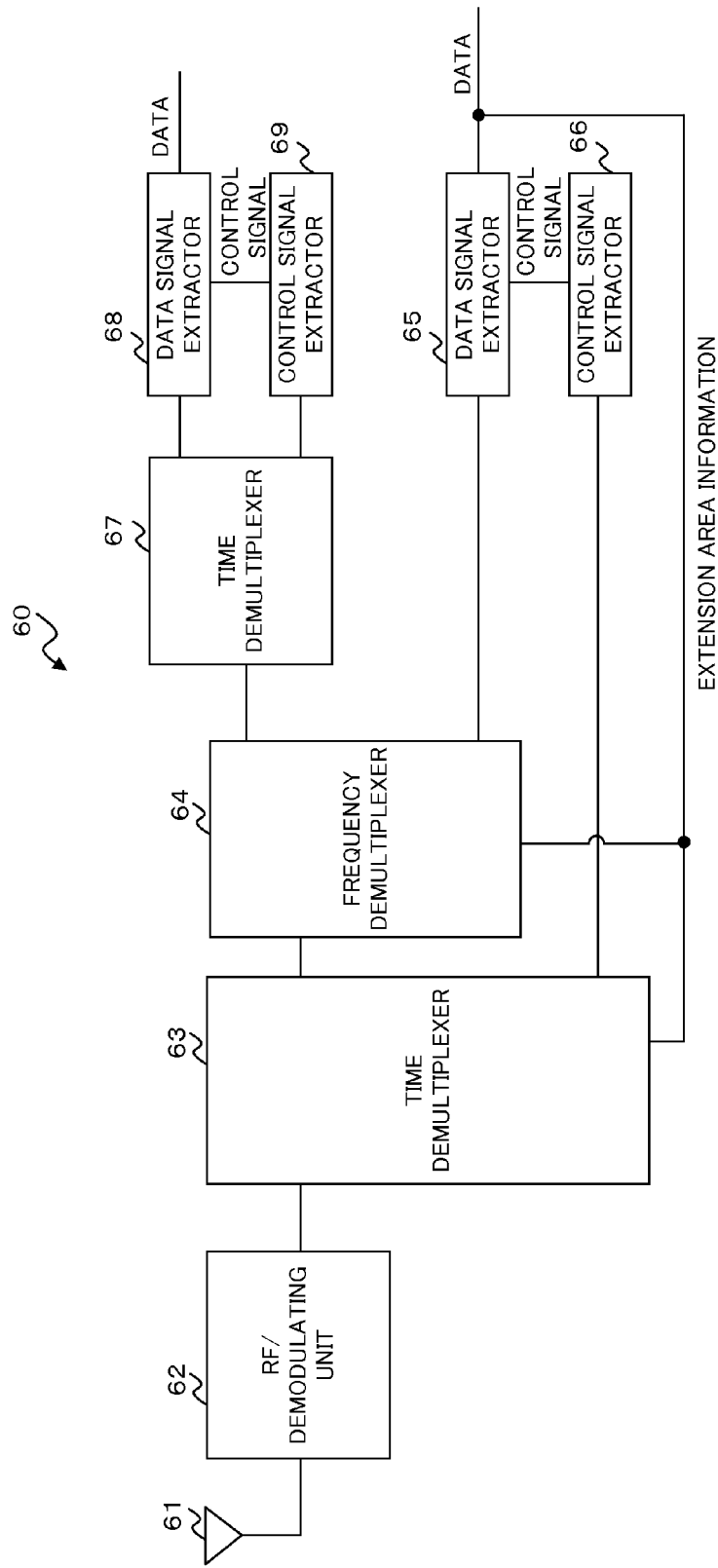
FIG. 9 is a diagram illustrating an exemplary configuration of a receiving device according to the second embodiment.

FIG. 9 is a diagram illustrating a configuration of a receiving device according to the second embodiment.

For example, a receiving device 60 illustrated in FIG. 9 includes a receiving antenna 61, an RF/demodulating unit 62, time demultiplexers 63 and 67, a frequency demultiplexer 64, data signal extractors 65 and 68, and control signal extractors 66 and 69.

The radio signal received by the receiving antenna 61 is subjected to a certain radio reception process (for example, a down-converting process) and a demodulation process in the RF/demodulating unit 62, and then time-demultiplexed in the time demultiplexer 63.

The output signal of the time demultiplexer 63 is frequency-demultiplexed in the frequency demultiplexer 64.

The output signal of the frequency demultiplexer 64 is time-demultiplexed in the time demultiplexer 67.

In other words, the time demultiplexers 63 and 67 and the frequency demultiplexer 64 function as an example of a signal demultiplexer that performs time demultiplexing and frequency demultiplexing on the existing radio signal and the new radio signal.

The control signal extractor 66 extracts the control signal from the output of the time demultiplexer 63, and outputs the extracted control signal to the data signal extractor 65.

The data signal extractor 65 extracts, from the output of the frequency demultiplexer 64, the data signal of the existing radio signal and the extension area information based on the control signal output from the control signal extractor 66.

The control signal extractor 69 extracts the control signal of the new radio signal from the output of the time demultiplexer 67, and outputs the extracted control signal to the data signal extractor 68.

The data signal extractor 68 extracts the data signal of the new radio signal from the output of the time demultiplexer 67 based on the control signal output from the control signal extractor 69.

In other words, the control signal extractors 66 and 69 function as an example of a control information extractor that extracts control information related to the existing radio signal and control information related to the new radio signal from the signal demultiplexed by the signal demultiplexer, and the data signal extractors 65 and 68 function as an example of a signal extractor that extracts the existing radio signal and the new radio signal based on the control information extracted by the control information extractor.

In the example illustrated in FIG. 9, the extension area information extracted by the data signal extractor 65 is input to the time demultiplexer 63 and the frequency demultiplexer 64, and the time demultiplexer 63 and the frequency demultiplexer 64 perform time demultiplexing and frequency demultiplexing based on the extension area information, so that the new radio signal is output.

The data signal generators 41 and 44, the control signal generators 42, 43 and 45, the multiplexer 46, the time multiplexers 47 and 49, and the frequency multiplexer 48 which are equipped in the transmitting device 40, and the time demultiplexers 63 and 67, the frequency demultiplexer 64, the data signal extractors 65 and 68, and the control signal extractors 66 and 69 which are equipped in the receiving device 60 may be configured using a DSP, a CPU, or the like appropriately.

The modulating/RF unit 50 and the RF/demodulating unit 62 may be configured by a combination of various kinds of analog circuits and digital circuits appropriately.

Figure 10:
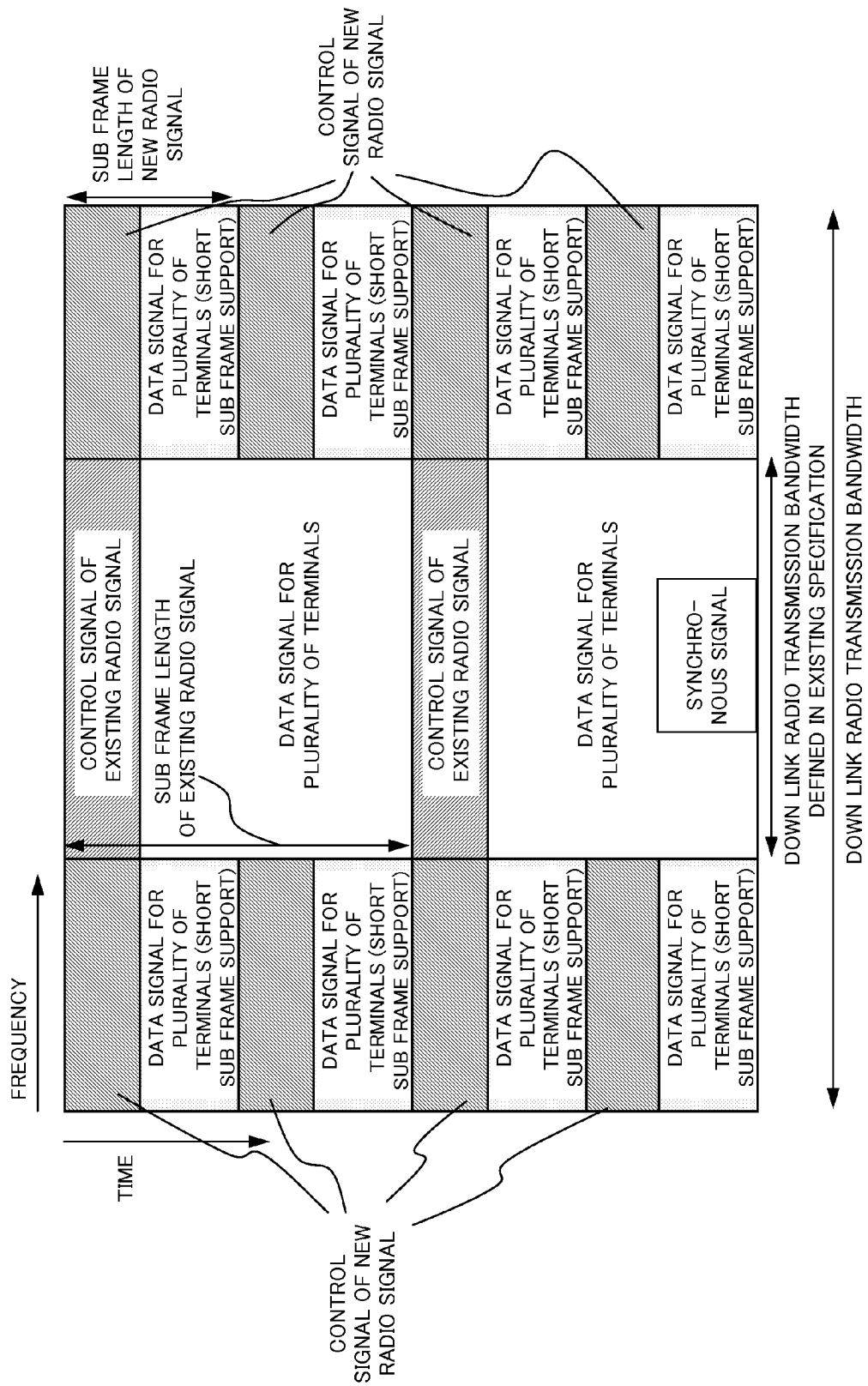
FIG. 10 is a diagram illustrating exemplary mapping according to the second embodiment.

FIG. 10 is a diagram illustrating exemplary mapping according to the second embodiment.

In the example illustrated in FIG. 10, only the existing radio signal is mapped in the existing band, and the new radio signal is mapped at both sides thereof.

Further, for example, as the control signal related to the existing radio signal is mapped in the existing band, the existing terminal can receive only the existing radio signal as in the related art by monitoring only the existing band and performing the reception process.

Meanwhile, for example, as the control signal related to the new radio signal is mapped in the transmission band of the new radio signal, the mobile radio terminal capable of receiving both the new radio signal and the existing radio signal can receive both the new radio signal and the existing radio signal by monitoring the transmission band of the new radio signal and the transmission band of the existing radio signal and performing the reception process.

In other words, the radio terminal device capable of receiving only the existing radio signal monitors the control signal transmitted through the inside part of the carrier band, and the radio terminal device capable of receiving both the existing radio signal and the new radio signal monitors the control signal transmitted through the entire carrier band and the control signal transmitted through the inside of the carrier band.

Further, data to be decoded by the radio terminal device according to the content of the received and decoded control signal is transmitted from the radio base station device to the radio terminal device using an inside part of the carrier band when the radio terminal device is capable of receiving only the existing radio signal or using a part of the entire carrier band when the radio terminal device is capable of receiving both the existing radio signal and the new radio signal.

Through the above-described configuration, it is possible to introduce the mobile radio terminal capable of using radio sub frames of different lengths according to the nature of data without influencing the mobile radio terminal designed according to the existing specification.

Further, since the synchronous signal is mapped to be arranged in the center in both the existing band and the carrier band, the synchronous signal can be used by both the existing terminal and the new terminal, and since synchronous signals need not be set separately for the existing terminal and the new terminal, the transmission band can be efficiently used, and the design cost of the terminal can be reduced.

[3] Modification of Second Embodiment

Figure 11:
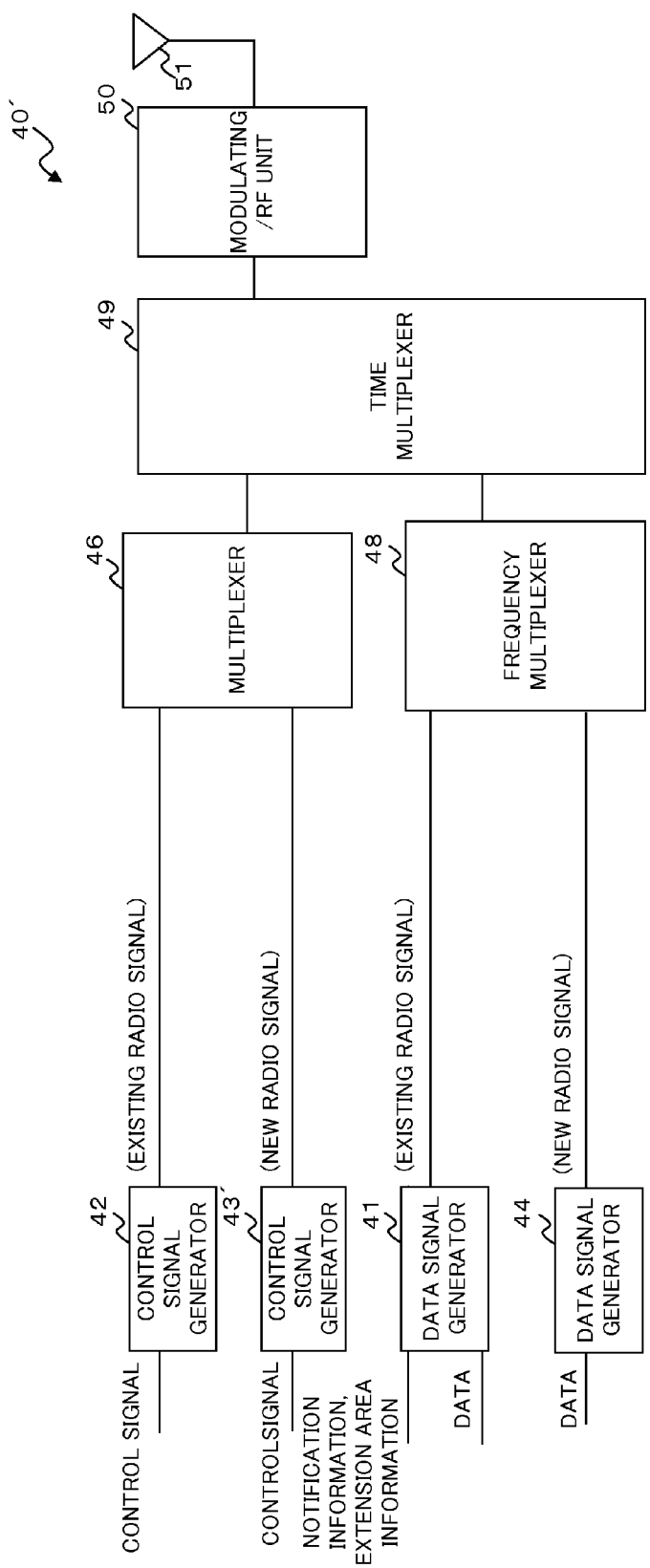
FIG. 11 is a diagram illustrating an exemplary configuration of a transmitting device according to a first modification of the second embodiment.

FIG. 11 is a diagram illustrating a transmitting device according to a first modification of the second embodiment.

For example, a transmitting device 40' illustrated in FIG. 11 includes data signal generators 41 and 44, control signal generators 42 and 43', a multiplexer 46, a time multiplexer 49, a frequency multiplexer 48, a modulating/RF unit 50, and a transmitting antenna 51. In FIG. 11, the components denoted by the same reference numerals have the same function as the above-described components, and thus a detailed description thereof will not be repeated.

The control signal generator 43' generates a control signal associated with transmission of the data signal of the new radio signal generated in the data signal generator 44. The control signal generator 43' generates a control signal corresponding to two sub frames of the new radio signal.

Figure 12:
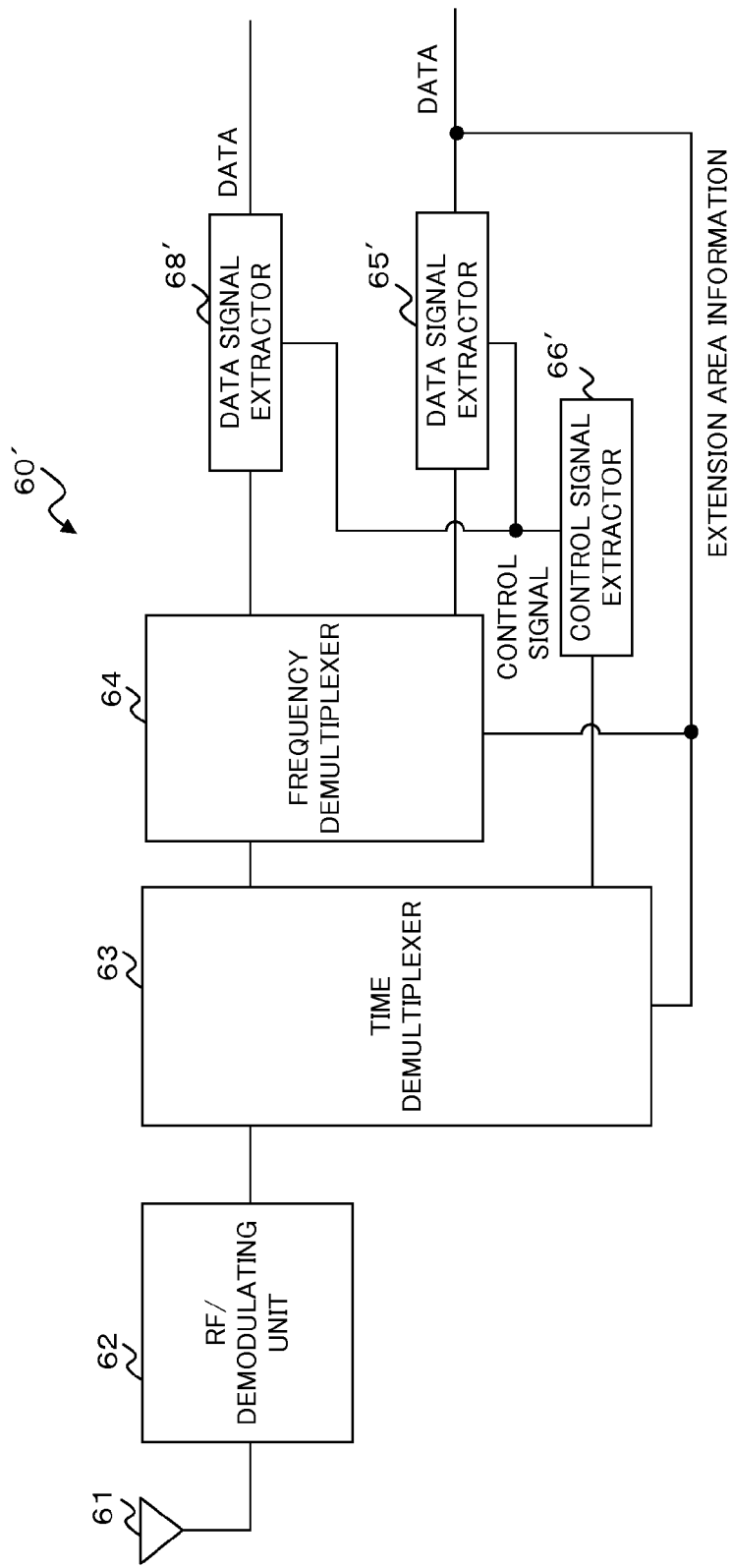
FIG. 12 is a diagram illustrating an exemplary configuration of a receiving device according to the first modification of the second embodiment.

FIG. 12 is a diagram illustrating a transmitting device according to the first modification of the second embodiment.

For example, a receiving device 60' illustrated in FIG. 12 includes a receiving antenna 61, an RF/demodulating unit 62, a time demultiplexer 63, a frequency demultiplexer 64, data signal extractors 65' and 68', and a control signal extractor 66'. In FIG. 12, the components denoted by the same reference numerals as described above have the same function as the above-described components, and thus a detailed description thereof will not be repeated.

The control signal extractor 66' extracts the control signals of the existing radio signal and the new radio signal from the output of the time demultiplexer 63, and outputs the extracted control signal to the data signal extractors 65' and 68'.

The data signal extractor 65' extracts the data signal of the existing radio signal and the extension area information from the output of the frequency demultiplexer 64 based on the control signal output from the control signal extractor 66'.

The data signal extractor 68' extracts the data signal of the new radio signal from the output of the frequency demultiplexer 64 based on the control signal output from the control signal extractor 66'.

Figure 13:
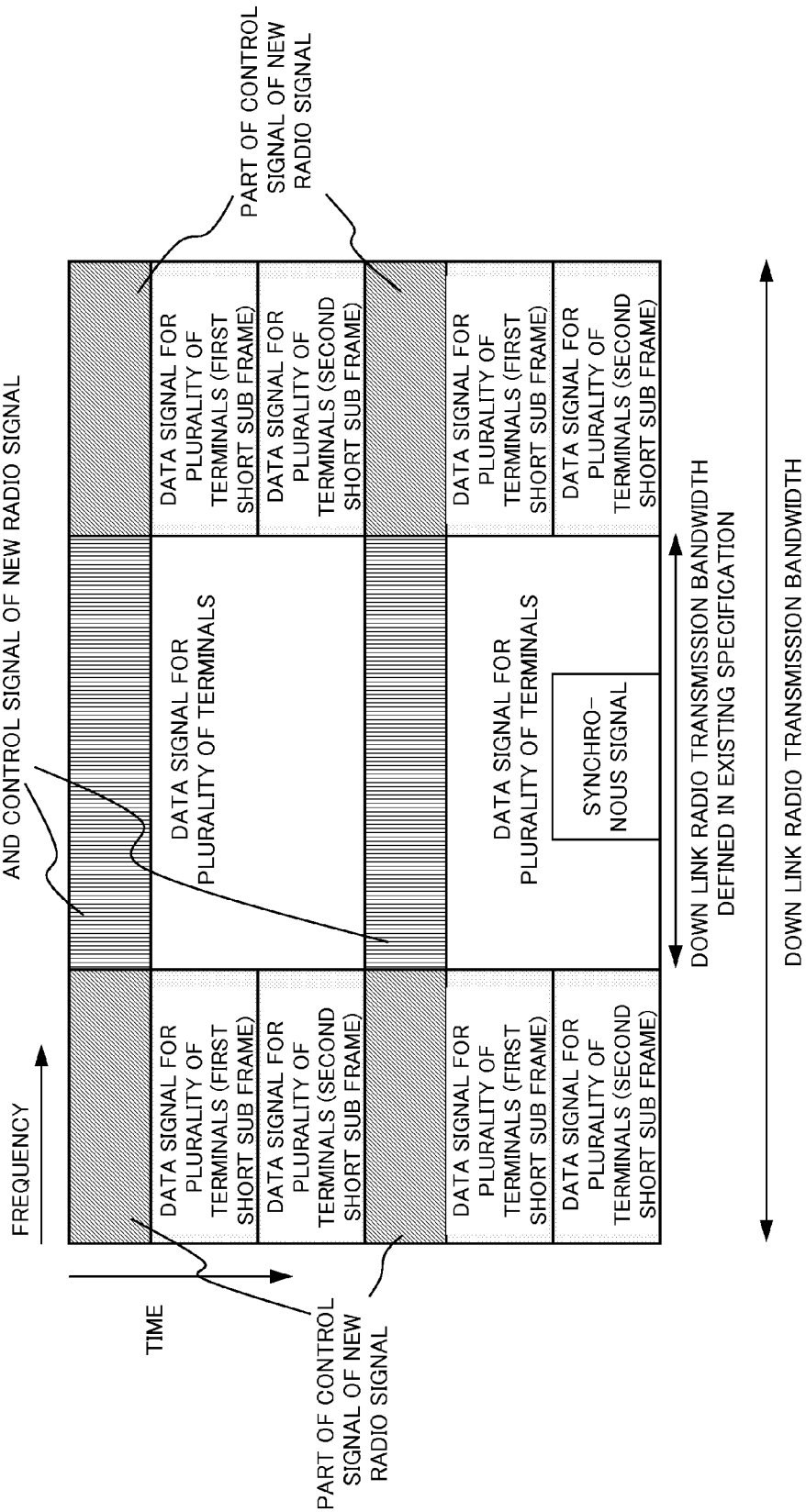
FIG. 13 is a diagram illustrating exemplary mapping according to the first modification of the second embodiment.

FIG. 13 is a diagram illustrating exemplary mapping according to the first modification of the second embodiment.

In the example illustrated in FIG. 13, only the existing radio signal is mapped in the existing band, and the new radio signal is mapped at both sides thereof.

Meanwhile, for the control signal, parts of the control signal of the existing radio signal and the control signal of the new radio signal are arranged in the existing radio band together, and the control signal of the new radio signal is arranged on both sides thereof.

Unlike the second embodiment, the control signal of the new radio signal is transmitted together in a time zone in which the control signal of the existing radio signal is transmitted.

In the control signal to be transmitted to each radio terminal device, of first and second short sub frames, a short sub frame used for transmission of the data signal with which the control signal is associated is represented using one bit. Further, a frequency part of each short sub frame used for transmission of the data signal is represented in the control signal, for example, using a bit map.

Figure 14:
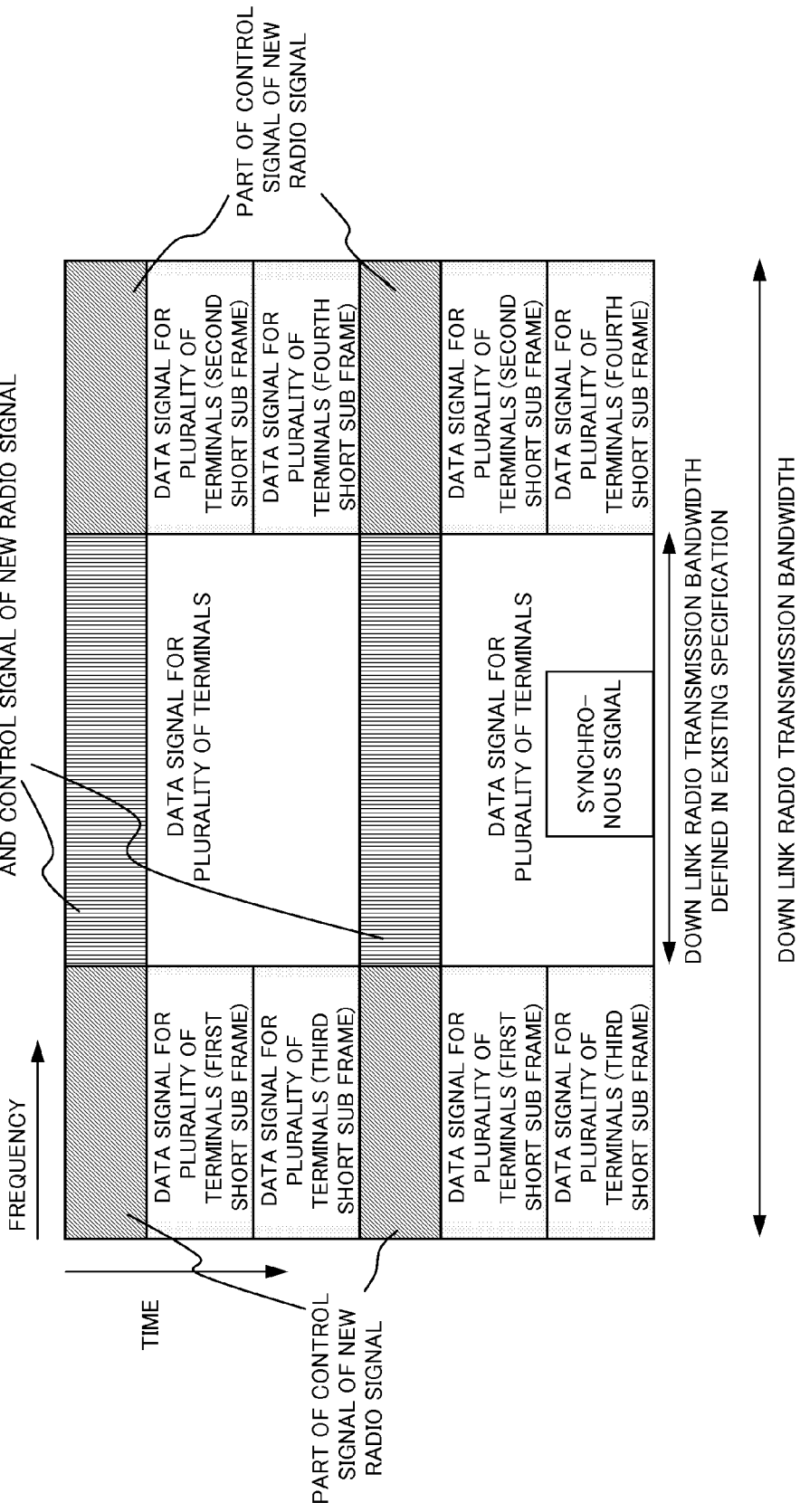
FIG. 14 is a diagram illustrating exemplary mapping according to a second modification of the second embodiment.

Further, mapping may be performed as illustrated in FIG. 14 using the transmitting device 40' illustrated in FIG. 11 and the receiving device 60' illustrated in FIG. 12.

In this case, in the control signal to be transmitted to each radio terminal device, among first to fourth short sub frames, a short sub frame used for transmission of the data signal with which the control signal is associated is represented using two bits. Further, a frequency part of each short sub frame used for transmission of the data signal is represented in the control signal, for example, using a bit map.

According to the above modifications, similarly to the above-described embodiments, it is possible to introduce the mobile radio terminal capable of using radio sub frames of different lengths according to the nature of data without influencing the mobile radio terminal designed according to the existing specification.

Further, since the control signals are not intermittent on the frequency axis, compatibility with the LTE specification of the related art is good.

[4] Others

The respective components and the respective functions of the transmitting devices 10, 40 and 40' and the receiving devices 30, 60 and 60' may be selected according to need or may be appropriately combined. In other words, the respective components and the respective functions may be selected or may be appropriately combined so that the functions according to the present disclosure can be implemented.

Figure 15:
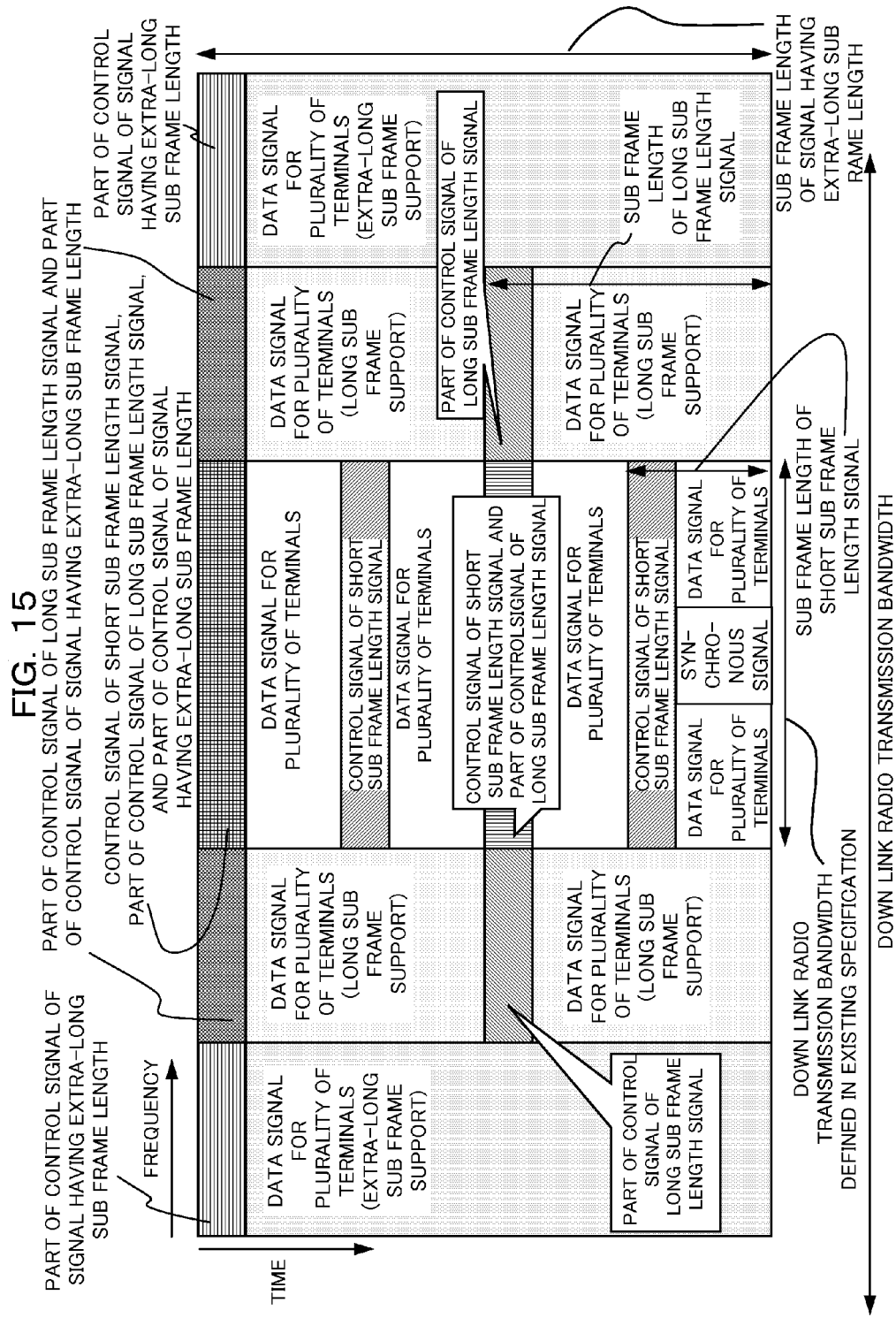
FIG. 15 is a diagram illustrating mapping according to a modification of the first embodiment.

The first embodiment has been described in connection with the example in which the two different radio sub frames are simultaneously transmitted, but three types of radio sub frames may be simultaneously transmitted. In this case, mapping may be performed as illustrated in FIG. 15.

In this case, a transmitting device may be configured by further arranging the data signal generator, the control signal generator, the frequency multiplexer, and the time multiplexer which are surrounded by a chain line in FIG. 5 at the stage prior to the modulating/RF unit 20.

Figure 16:
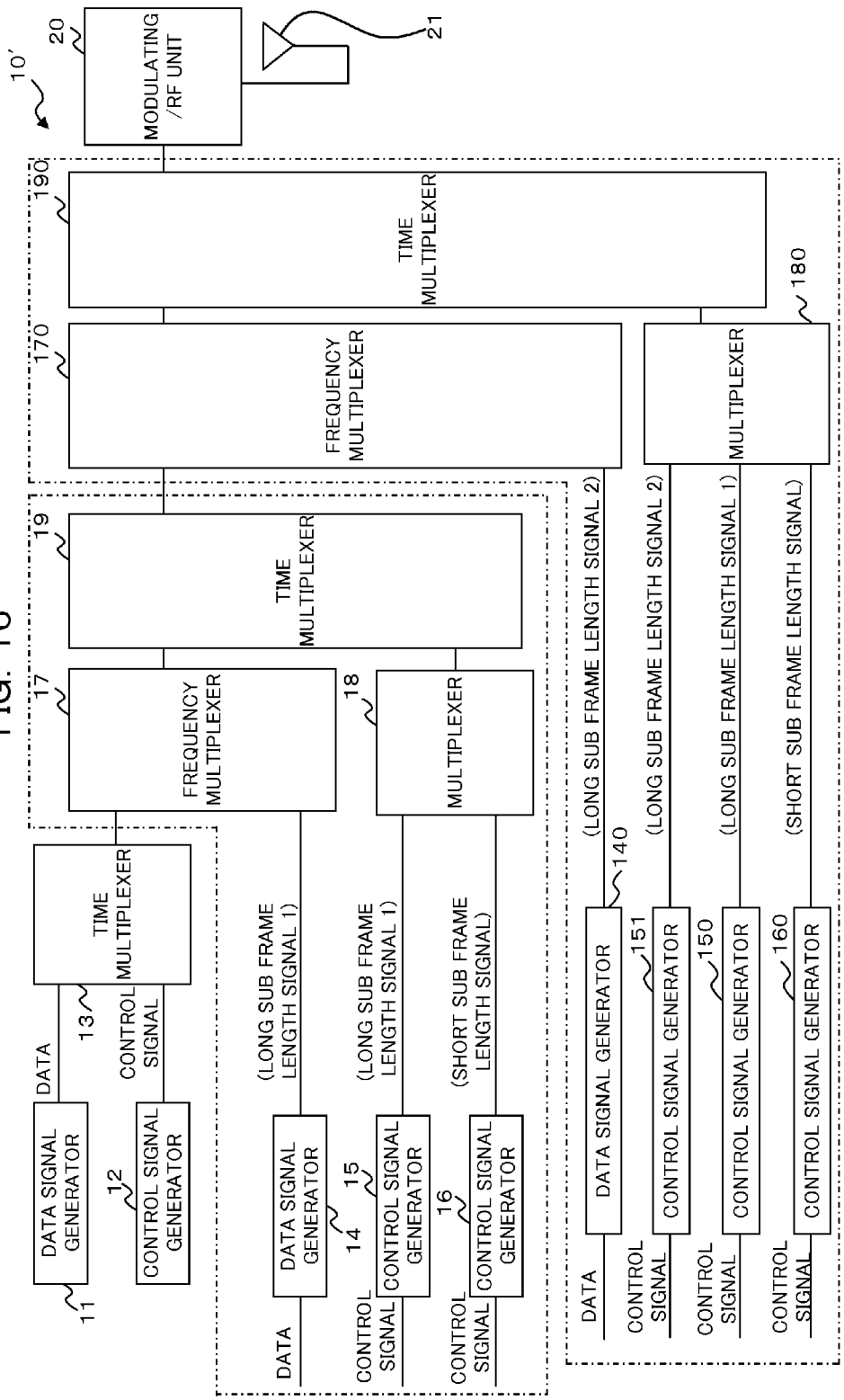
FIG. 16 is a diagram illustrating a transmitting device according to a modification of the first embodiment.

In this case, an exemplary configuration of the transmitting device is illustrated in FIG. 16.

Further, when the number of types of radio sub frames is further increased, it is desirable to further add the data signal generator, the control signal generator, the frequency multiplexer, and the time multiplexer which are surrounded by a chain line in FIG. 5.

Meanwhile, a receiving device may be configured by further arranging the time demultiplexer, the frequency demultiplexer, the data signal extractor, and the control signal extractor which are surrounded by a chain line in FIG. 6 at the stage behind the RF/demodulating unit 32.

Figure 17:
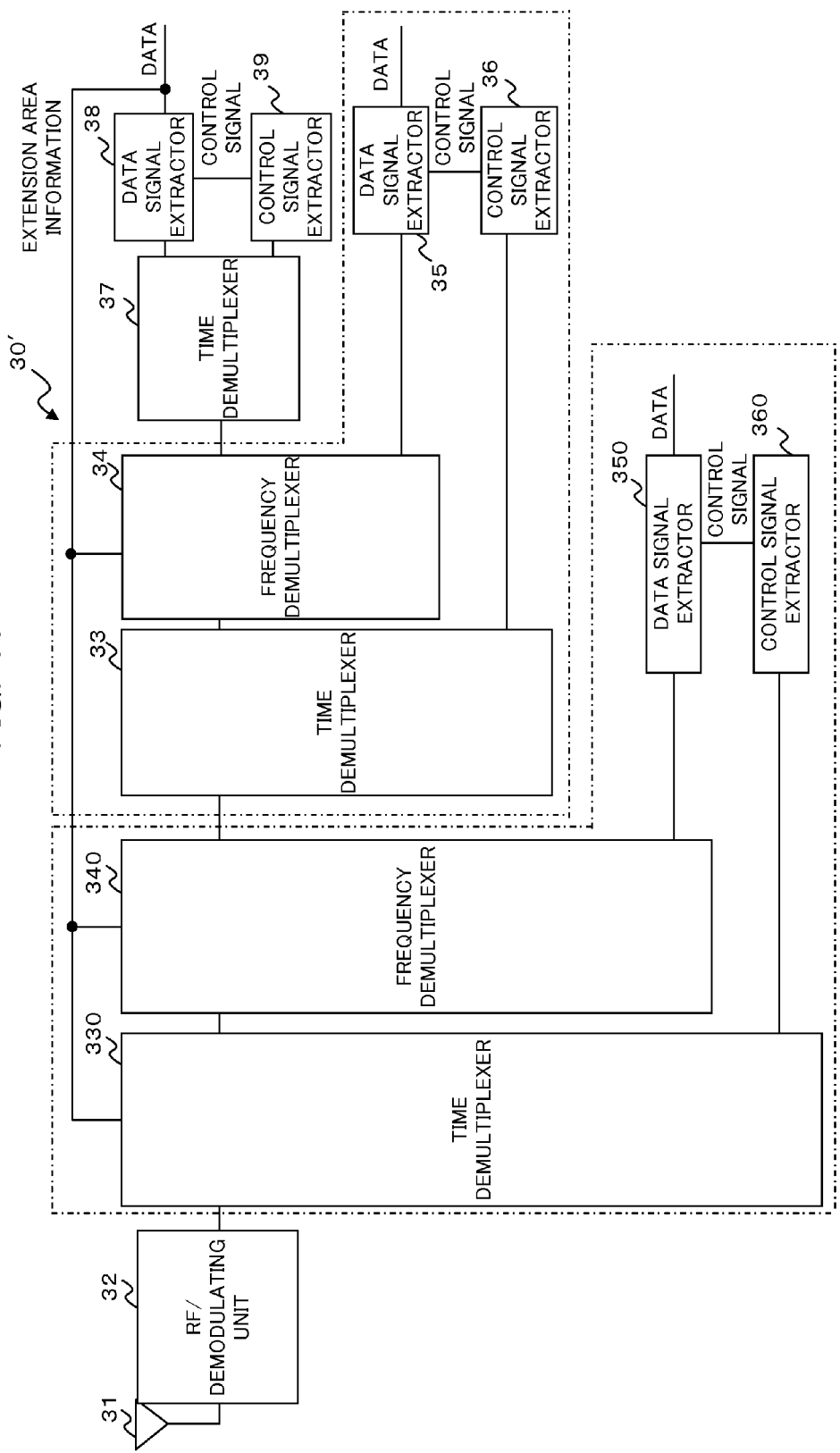
FIG. 17 is a diagram illustrating a receiving device according to a modification of the first embodiment.

An exemplary configuration of the receiving device in this case is illustrated in FIG. 17.

Further, when the number of types of radio sub frames is increased, it is desirable to further add the time demultiplexer, the frequency demultiplexer, the data the signal extractor, and the control signal extractor which are surrounded by a chain line in FIG. 6.

Further, in the second embodiment, similarly, a plurality of signals having radio sub frames of different lengths may be simultaneously transmitted.

Further, the second embodiment has been described in connection with the example in which the existing band exists only in a specific frequency but can be similarly applied to an example in which the existing band exists in a different frequency for each sub frame.

Figure 18:
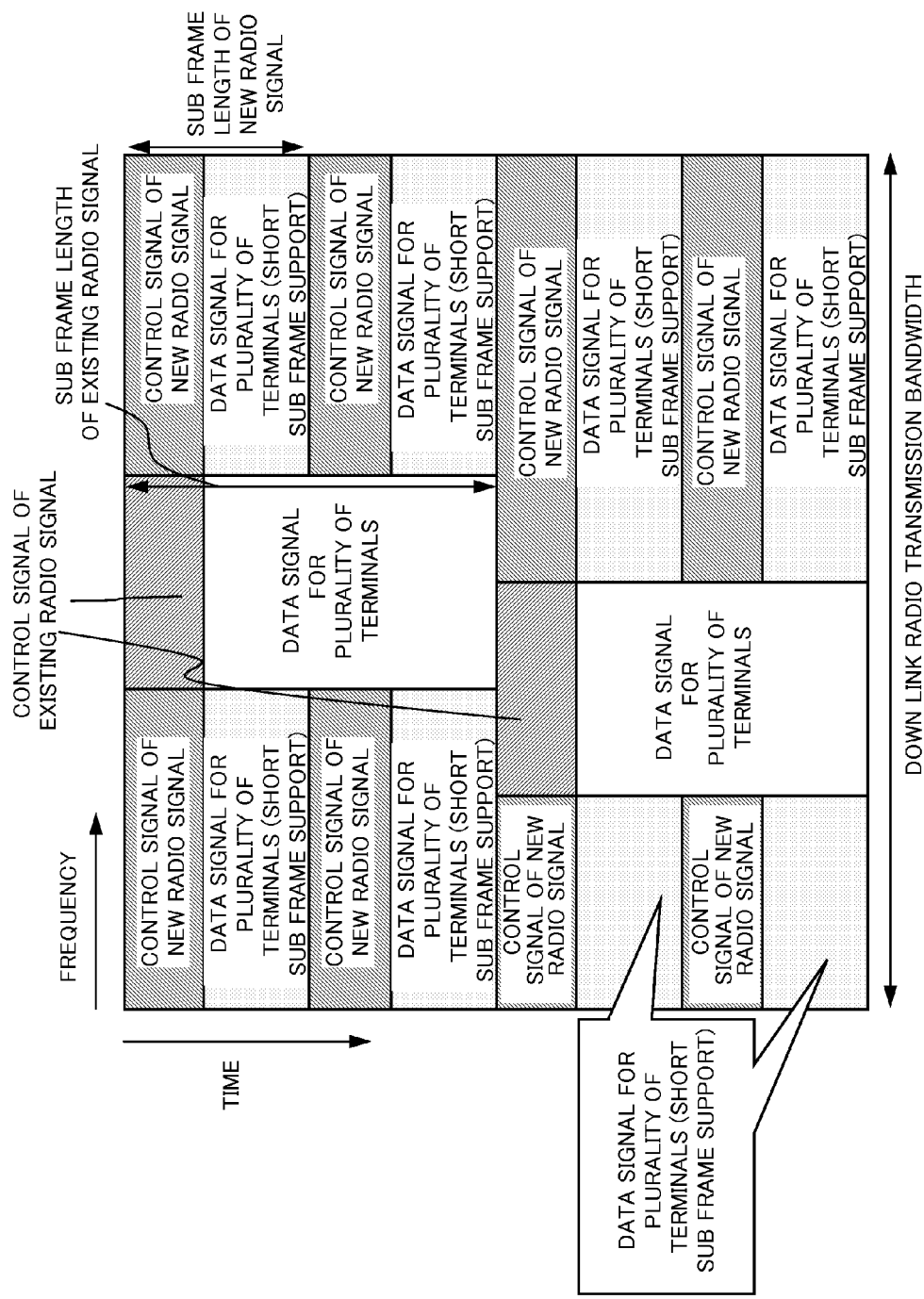
FIG. 18 is a diagram illustrating mapping according to a modification of the second embodiment.

In this case, for example, mapping may be performed as illustrated in FIG. 18. For the position of the synchronous signal, a mapped position may be decided in advance and shared by the transmitting device and the receiving device, or separate notification using a control signal may be made.

Figure 19:
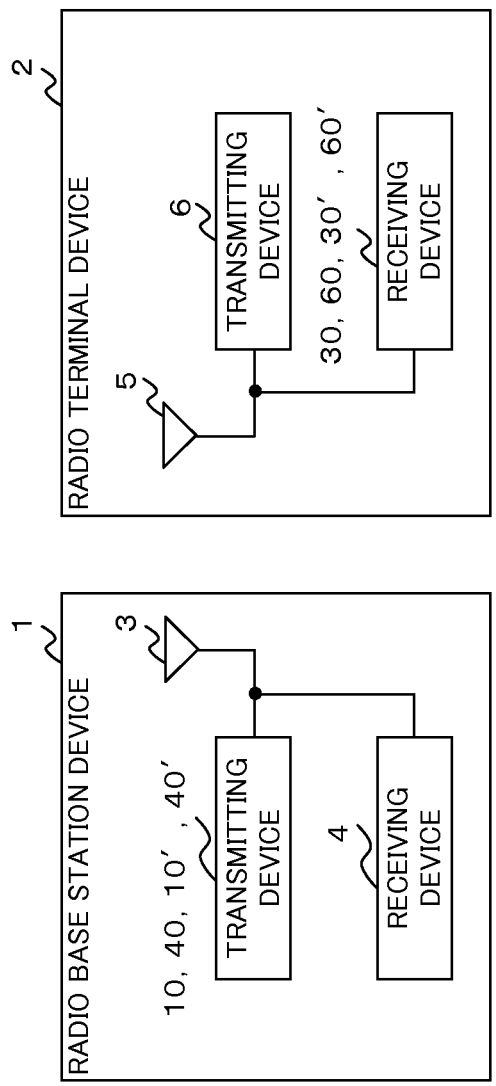
FIG. 19 is a diagram illustrating exemplary configurations of a base station device employing the transmitting device of the present disclosure and a radio terminal device employing the receiving device of the present disclosure.

Further, as illustrated in FIG. 19, a radio base station device 1 may be configured using the respective components and the respective functions of the transmitting devices 10, 40, 10' and 40' appropriately.

Further, as illustrated in FIG. 19, a radio terminal device 2 may be configured using the respective components and the respective functions of the receiving devices 30, 60, 30' and 60' appropriately.

According to the embodiments of the disclosure, it is possible to implement a mobile communication system in which sub frames of different lengths can be transmitted and received without influencing an existing system.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A radio signal transmission method, comprising:
   transmitting a plurality of radio signals having different sub frame lengths on a radio carrier,
   arranging a plurality of short sub frames inside the radio carrier, each of the plurality of short sub frames having lengths in time domain equal to each other and widths in frequency domain equal to each other, each of the short sub frames comprising a control region appended in time domain with a data region corresponding to a plurality of user terminals, the control region and the data region being of equal widths in frequency domain;
   arranging, by a multiplexer, of a long sub frame to be only outside a frequency band width of the short sub frame and within the frequency band width of the radio carrier, the long sub frame having a length equal to a multiple of the length of a short sub frame and is aligned in time with a sequence of the continuous short sub frames such that the start of the first short sub frame of the sequence is aligned in time with the start of the long sub frame and the end of the last short sub frame of the sequence is aligned in time with the end of the long sub frame;
   transmitting, in the control region of each short sub frame, information indicating the frequency band width of corresponding each of the short sub frame, to a terminal capable of receiving only the short sub frames as control information of the short sub frames arranged throughout the frequency band width of the short sub frames; and
   transmitting the information indicating related to the frequency band width of the short sub frames and information indicating the frequency band width of the radio carrier, to a terminal capable of receiving both the short sub frame and the long sub frame as control information, arranged throughout the frequency band width of the radio carrier and overlapping the control region of the first short frame of the sequence, of the long sub frame.

2. The radio signal transmission method according to claim 1,
   wherein a synchronous signal related to the short sub frames and the long sub frame is arranged in a central portion of the radio carrier.

3. The radio signal transmission method according to claim 1,
wherein an area through which the short sub frames are transmitted differs from an area through which the long sub frame is transmitted in at least one of an arrangement pattern, an arrangement density, and a code sequence of a reference signal used by a radio terminal device for demodulation of a data signal or a control signal, or quality evaluation of a radio section between a radio base station device and each radio terminal device.

4. A radio signal transmitting device that transmits a first radio signal of a plurality of short sub frames on a radio carrier and a second radio signal of a long sub frame, each of the plurality of short sub frames having lengths in time domain equal to each other and widths in frequency domain equal to each other, each of the short sub frames comprising a control region appended in time domain with a data region corresponding to a plurality of user terminals, the control region and the data region being of equal widths in frequency domain, the radio signal transmitting device comprising:
an first radio signal generator that generates the short sub frames, and generates information indicating a frequency band width of the short sub frame as control information, arranged throughout the frequency band width of the short sub frames, of each of the short sub frame which is transmitted, in respective control regions of each of the certain sub frames, to a terminal capable of receiving only the short sub frames;
a second radio signal generator that generates the long sub frame of the second radio signal, and generates the information indicating the frequency band width of the short sub frame and information indicating the radio carrier as control information, arranged throughout the frequency band width of the radio carrier and overlapping the control region of the first short sub frame of a sequence of continuous short sub frames, of the long sub frame of the second radio signal which is transmitted to a terminal capable of receiving both the short sub frames and the long sub frame of the second radio signal; and
a signal multiplexer that:
performs time multiplexing and frequency multiplexing on the short sub frames and the long sub frame of the second radio signal such that the long sub frame of the second radio signal has a length equal to a multiple of the length of a short sub frame and is aligned in time with the sequence of the continuous short sub frames such that the start of the first short sub frame of the sequence is aligned in time with the start of the long sub frame of the second signal and the end of the last short sub frame is aligned in time with the end of the long sub frame of the second radio signal, the short sub frames generated by the first radio signal generator are arranged inside the radio carrier, and the long sub frame of the second radio signal generated by the second radio signal generator is arranged only outside the frequency band width of the short sub frames and within the radio carrier;
performs multiplexing on the information related to the short sub frame and the control information related to the long sub frame of the second radio signal.

5. The radio signal transmitting device according to claim 4,
wherein the signal multiplexer arranges a synchronous signal related to the short sub frames and the long sub frame of the second radio signal in a central portion of the radio carrier.

6. A radio signal receiving device that receives either of a signal of the short sub frames and a signal of the long sub frame from the radio signal transmitting device according to claim 4, the radio signal receiving device comprising:
a signal demultiplexer that performs time demultiplexing and frequency demultiplexing on the signal of short sub frames and the signal of the long sub frame;
a control information extractor that extracts the control information of the short sub frames and the control information of the long sub frame from a signal outputted by the signal demultiplexer; and
a signal extractor that extracts the first radio signal of the short sub frames and the second radio signal of the long sub frame based on the control information extracted by the control information extractor.

* * * * *